US012756787B2

(12) United States Patent
Ichiu et al.

(10) Patent No.: US 12,756,787 B2
(45) Date of Patent: Oct. 6, 2026

(54) CONTROL SYSTEM, IMAGE FORMING APPARATUS, TERMINAL APPARATUS, AND CONTROL METHOD

(71) Applicant: SHARP KABUSHIKI KAISHA, Sakai City (JP)

(72) Inventors: Rika Ichiu, Sakai City (JP); Chikako Tomita, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 347 days.

(21) Appl. No.: 18/629,359

(22) Filed: Apr. 8, 2024

(65) Prior Publication Data

US 2024/0348737 A1 Oct. 17, 2024

(30) Foreign Application Priority Data

Apr. 13, 2023 (JP) ................................ 2023-065799

(51) Int. Cl.
*H04N 1/00* (2006.01)
*H04N 1/44* (2006.01)

(52) U.S. Cl.
CPC ..... *H04N 1/00973* (2013.01); *H04N 1/00413* (2013.01); *H04N 1/4433* (2013.01)

(58) Field of Classification Search
None
See application file for complete search history.

(56) References Cited

U.S. PATENT DOCUMENTS 11,816,381 B2 * 11/2023 Urakawa ............... H04L 63/107
2016/0196130 A1 7/2016 Shimizu
2018/0260172 A1 * 9/2018 Nakamura ......... H04N 1/00503

FOREIGN PATENT DOCUMENTS

JP 2015-052996 A 3/2015

* cited by examiner

*Primary Examiner* — Darryl V Dottin
(74) *Attorney, Agent, or Firm* — ScienBiziP, P.C.

(57) ABSTRACT

A control system includes an image forming apparatus and a terminal apparatus. The image forming apparatus determines whether the image forming apparatus is in a state conforming to a security requirement in response to a connection request from the terminal apparatus used by a user who has an administrator privilege; and transmits, to the terminal apparatus, display information of a first display screen through which a firmware update of the image forming apparatus is to be performed when the image forming apparatus is in the state conforming to the security requirement, the first display screen including a selection item allowing selection of whether to display a status of the firmware update. The terminal apparatus displays, based on the display information of the first display screen, the first display screen including the selection item allowing the selection of whether to display the status of the firmware update.

7 Claims, 22 Drawing Sheets

| LOGIN INFORMATION | | USERNAME | PRIVILEGE |
|---|---|---|---|
| USER ID | PASSWORD | | |
| service | abc123 | SERVICE PERSON A | SERVICE |
| admin | def456 | ADMINISTRATOR A | ADMINISTRATOR |
| userA | ghi789 | USER A | – |
| userB | jkl012 | USER B | – |
| ⋮ | ⋮ | ⋮ | ⋮ |

FIG. 3

| CONFIGURATION | ADMINISTRATOR PRIVILEGE | SERVICE PRIVILEGE |
|---|---|---|
| HCD cPP CONFORMING STATE | DISPLAY FIRMWARE UPDATE PAGE | NOT DISPLAY FIRMWARE UPDATE PAGE |
| OTHER THAN HCD cPP CONFORMING STATE | NOT DISPLAY FIRMWARE UPDATE PAGE | DISPLAY FIRMWARE UPDATE PAGE |

FIG. 8

CONTROL SYSTEM, IMAGE FORMING APPARATUS, TERMINAL APPARATUS, AND CONTROL METHOD

TECHNICAL FIELD

The present disclosure relates to a control system and the like.

BACKGROUND ART

There has been proposed a technology for updating firmware of an image forming apparatus such as a digital multi-function peripheral/printer (MFP). For example, regarding an image forming apparatus configured to meet security specifications, there has been proposed a technology for updating firmware only when an instruction is given from a user who has an administrator privilege.

SUMMARY

Technical Problem

An object of the present disclosure is to provide a control system and the like allowing a user to appropriately update firmware.

Solution to Problem

To solve the above problem, a control system according to the present disclosure includes an image forming apparatus and a terminal apparatus. The image forming apparatus determines whether the image forming apparatus is in a state conforming to a security requirement in response to a connection request from the terminal apparatus used by a user who has an administrator privilege; and transmits, to the terminal apparatus, display information of a first display screen through which a firmware update of the image forming apparatus is to be performed when the image forming apparatus is in the state conforming to the security requirement, the first display screen including a selection item allowing selection of whether to display a status of the firmware update. The terminal apparatus displays, based on the display information of the first display screen, the first display screen including the selection item allowing the selection of whether to display the status of the firmware update.

An image forming apparatus according to the present disclosure includes one or more controllers and a communicator that communicates with a terminal apparatus. The one or more controllers determine whether the image forming apparatus is in a state conforming to a security requirement in response to a connection request from the terminal apparatus used by a user who has an administrator privilege; and transmit, to the terminal apparatus via the communicator, display information of a display screen through which a firmware update is to be performed when the image forming apparatus is in the state conforming to the security requirement, the display screen including a selection item allowing selection of whether to display a status of the firmware update.

A control method according to the present disclosure is a control method of a control system including an image forming apparatus and a terminal apparatus. The control method includes: determining, by the image forming apparatus, whether the image forming apparatus is in a state conforming to a security requirement in response to a connection request from the terminal apparatus used by a user who has an administrator privilege; transmitting, by the image forming apparatus to the terminal apparatus, display information of a display screen through which a firmware update of the image forming apparatus is to be performed when the image forming apparatus is in the state conforming to the security requirement, the display screen including a selection item allowing selection of whether to display a status of the firmware update; and displaying, by the terminal apparatus, the display screen including the selection item allowing the selection of whether to display the status of the firmware update based on the display information.

Advantageous Effects of Invention

According to the present disclosure, it is possible to provide a control system and the like allowing a user to appropriately update firmware.

BRIEF DESCRIPTION OF DRAWINGS

FIG. 3 is a diagram illustrating an example of a data configuration of user information of the first embodiment.

FIG. 8 is a table showing correspondence between a privilege and whether it is possible to display a firmware update page in the first embodiment.

DESCRIPTION OF EMBODIMENTS

Embodiments according to the present disclosure will be described below with reference to the drawings. Note that the following embodiments are examples for explaining the present disclosure, and the technical content of the explanation described in the claims is not limited to the following description.

The following two types of means are typically used as means for firmware update (update of firmware) of a digital MFP.

(1) Means for updating firmware by causing a user who has an administrator privilege to transfer a file to be used for firmware update to a digital MFP using a universal serial bus (USB) memory stick.

(2) Means for updating firmware by causing a service person to upload a file to be used for firmware update to a digital MFP via a device web page, which is a web page provided by the digital MFP.

In contrast, as one of government procurement requirements for the digital MFP, it is necessary to satisfy predetermined security requirements. Examples of the security requirements include “hardcopy devices protection profile (HCD PP)”. In addition, HCD collaborative PP (HCD cPP) is a third-generation requirement of the government procurement requirements, and secure firmware update (update of firmware) is mandatory as an essential function.

In a state where the security requirements are satisfied, the digital MFP handles protected assets, and thus firmware update by a service person using a device web page is disabled. Thus, as means for firmware update of the digital MFP, there is no choice but to update firmware using a USB memory stick by a user who has an administrator privilege.

However, there is a possibility that the firmware cannot be updated using the USB memory stick in a state where the security requirements are satisfied. Thus, in order to make the digital MFP conform to the security requirements, it is desirable to disable a firmware update function using the USB memory stick.

In this way, when the digital MFP is brought into a state conforming to the security requirements, there is a concern that all types of typically used firmware update means are disabled and there is no firmware update means.

In view of such a problem, in the following embodiments, an example of a method of appropriately updating firmware even in a state where the image forming apparatus satisfies security conformance requirements will be described.

1. First Embodiment

1.1 Overall Configuration

Figure 1:
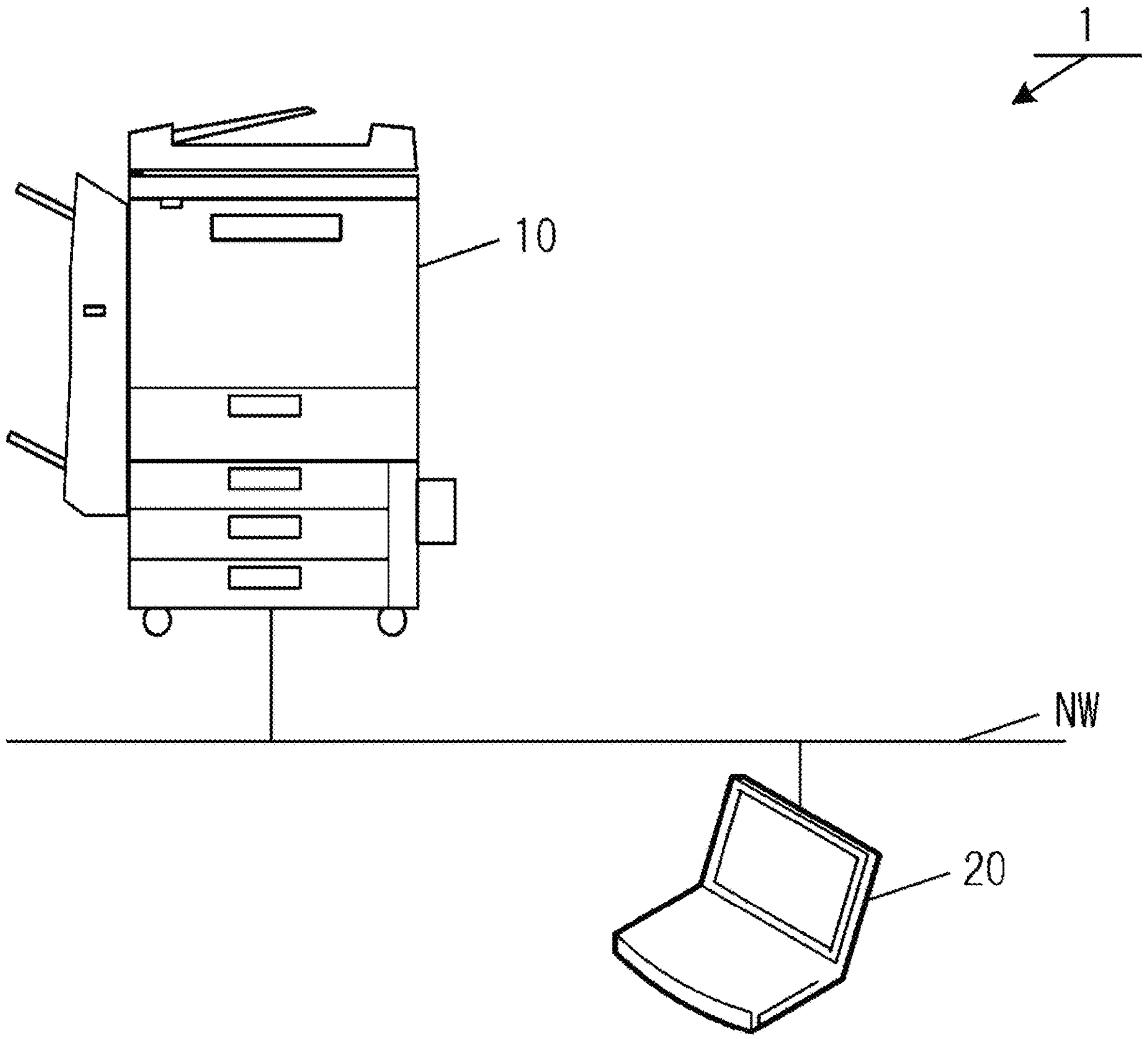
FIG. 1 is a diagram illustrating an overall configuration of a first embodiment.

FIG. 1 is a diagram illustrating an overall configuration of a system 1 according to the present embodiment. The system 1 includes an image forming apparatus 10 and a terminal apparatus 20 connected to each other via a network NW. The network NW is, for example, a LAN.

The image forming apparatus 10 is, for example, an information processing apparatus having a copy function, a scanner function, a printer function, a FAX function, and the like. The image forming apparatus 10 is also referred to as a multi-function peripheral/printer (MFP) or a digital MFP.

The terminal apparatus 20 is an information processing apparatus capable of communicating with the image forming apparatus 10 and is constituted by, for example, a PC or a server apparatus.

It is assumed that communication using the transport layer security (TLS) protocol can be performed between the image forming apparatus 10 and the terminal apparatus 20. For example, it is assumed that the Hypertext Transfer Protocol Secure (HTTPS) and the File Transfer Protocol over SSL/TLS (FTPS) can be used as application protocols in communication between the image forming apparatus 10 and the terminal apparatus 20.

In addition, the image forming apparatus 10 can set an operation mode to a state conforming to predetermined security requirements. Here, the security requirements are requirements related to security defined among predetermined organizations, countries, and the like. As the security requirements, for example, the following are known.

ISO/IEC1508.

IEEE2600

FASEC

Hardcopy devices protection profile (HCD PP)

Hardcopy devices collaborative protection profile (HCD cPP)

For the image forming apparatus 10 to conform to the security requirements, it is necessary to restrict or prohibit a predetermined function. Hereinafter, in the present embodiment, secure firmware update is mandatory as an essential function of the security requirements. When the image forming apparatus 10 is in a state conforming to the security requirements, for example, a predetermined interface (for example, a USB interface) is disabled in principle or use of the predetermined interface is prohibited. For example, HCD cPP is considered as an example of the security requirements. Hereinafter, the case of HCD cPP will be described as an example of the security requirements.

1.2 Functional Configuration

1.2.1 Image Forming Apparatus

Figure 2:
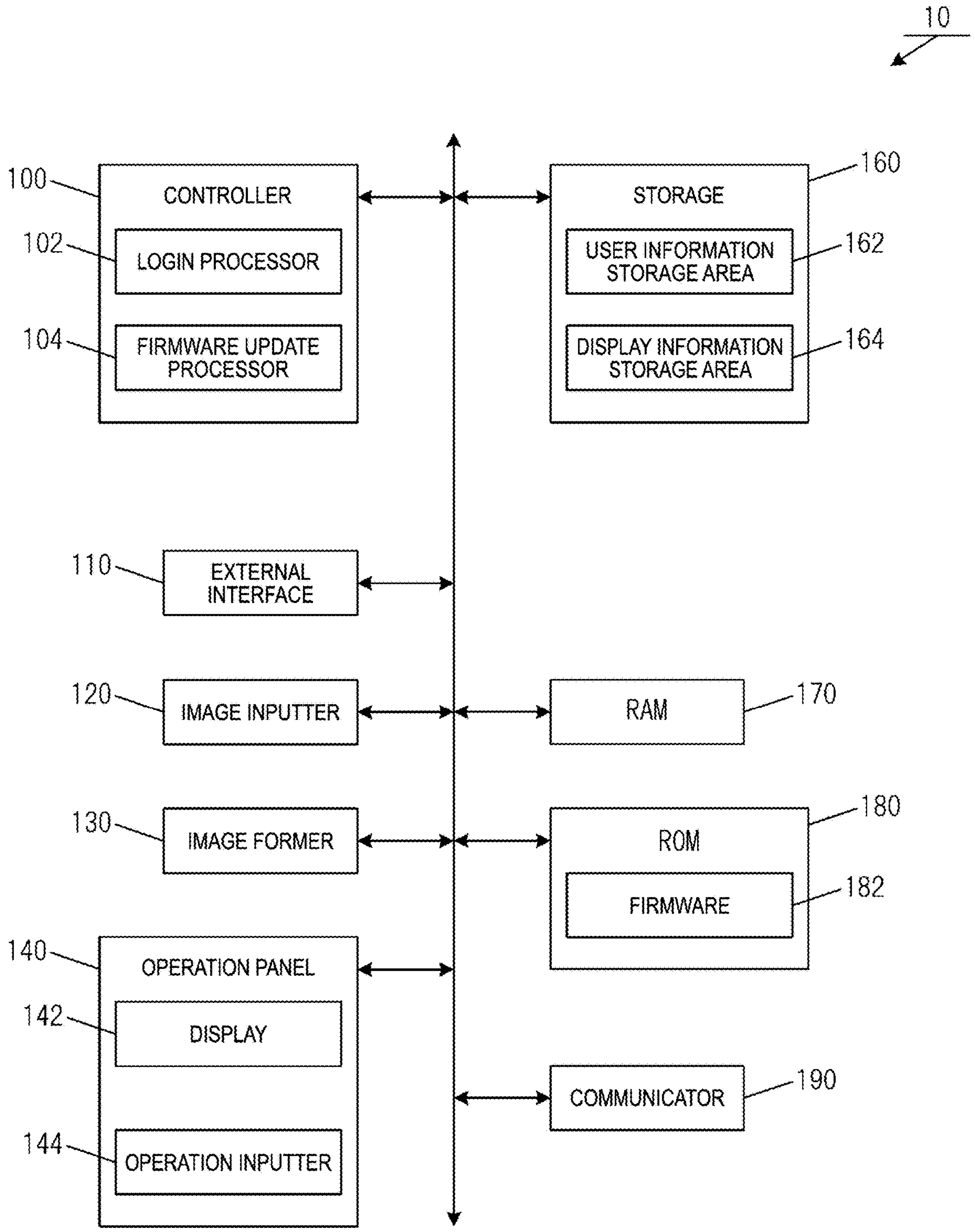
FIG. 2 is a diagram illustrating a functional configuration of an image forming apparatus of the first embodiment.

FIG. 2 is a diagram illustrating a functional configuration of the image forming apparatus 10. As illustrated in FIG. 2, the image forming apparatus 10 includes a controller 100, an external interface 110, an image inputter 120, an image former 130, an operation panel 140, a storage 160, a random access memory (RAM) 170, a read only memory (ROM) 180, and a communicator 190.

The controller 100 controls the entirety of the image forming apparatus 10. The controller 100 implements various functions by reading and executing various programs stored in the storage 160 and the ROM 180. The controller 100 is constituted by, for example, one or a plurality of arithmetic devices (such as central processing units (CPUs)). The controller 100 may be configured as a system on a chip (SoC) having a plurality of functions among the functions described below.

The controller 100 functions as a login processor 102 and a firmware update processor 104 by executing programs stored in the storage 160.

The login processor 102 executes processing related to login of a user who uses the image forming apparatus 10. For example, the login processor 102 acquires login information input via the operation panel 140 or login information transmitted from the terminal apparatus 20 when a connection request is made from the terminal apparatus 20 to the image forming apparatus 10 via the communicator 190. The login information is information used for login. Further, the login processor 102 compares the acquired login information with login information stored in below-described user information in advance. When the acquired login information matches the login information stored in advance, the login processor 102 causes the user corresponding to the login information to log in to the image forming apparatus 10.

The firmware update processor 104 executes firmware update processing, which is processing of updating firmware of the image forming apparatus 10 based on a file stored in a storage device connected to the external interface 110 described below. The firmware update processing will be described below.

The external interface 110 is connected to an external storage device such as a USB memory stick. The external interface 110 is configured as, for example, an external interface terminal.

The image input unit 120 inputs an image to the image forming apparatus 10. The image inputter 120 may be constituted by, for example, a scanner device that reads a document placed on a platen. The scanner device is, for example, a device that converts an image into an electric signal using an image sensor such as a charge coupled device (CCD) or a contact image sensor (CIS), and quantizes and encodes the electric signal.

The image former 130 forms (prints) an image on a recording medium such as a recording sheet. The image former 130 may be constituted by, for example, a printing device such as a laser printer using an electrophotographic system. The image former 130, for example, feeds a recording sheet from a sheet feed tray provided in the image forming apparatus 10, forms an image on a surface of the recording sheet, and discharges the recording sheet from a sheet discharge tray provided in the image forming apparatus 10.

The operation panel 140 receives an operation to the image forming apparatus 10 and displays various types of information. The operation panel 140 includes a display 142 and an operation inputter 144.

The display 142 displays various types of information. The display 142 may be constituted by, for example, a display device such as a liquid crystal display (LCD), an organic electro-luminescence (EL) display, or a micro light emitting diode (LED) display.

The operation inputter 144 receives an operation instruction from the user who uses the image forming apparatus 10. The operation inputter 144 may be constituted by an input device such as a key switch (hard key) or a touch sensor. A system for detecting an input by contact (touch) on the touch sensor may be a general detection system such as a resistive film system, an infrared system, an electromagnetic induction system, or a capacitance system for example. Note that the operation panel 140 may be a touch panel in which the display 142 and the operation inputter 144 are integrally formed.

The storage 160 is a non-volatile storage device capable of storing programs and data. The storage 160 may be constituted by a storage device such as a hard disk drive (HDD) or a solid state drive (SSD).

A user information storage area 162 and a display information storage area 164 are reserved in the storage 160 as storage areas.

The user information storage area 162 stores user information as information related to the user who uses the image forming apparatus 10. For example, as illustrated in FIG. 3, the user information includes a user ID (for example, "service"), which is identification information for identifying the user, a password (for example, "abc123"), which is authentication information used for authentication of the user, a username (for example, "service person A") of the user, and a privilege (for example, "service") of the user.

In the present embodiment, it is assumed that the user ID and the password are the login information. It is also assumed that either "service" or "administrator" may be stored as the privilege or neither "service" nor "administrator" may be stored.

A user whose privilege stored is "service" indicates a user who has a service privilege, which is a privilege for using a function necessary for repair or maintenance of the image forming apparatus 10. The user whose privilege stored is "service" is, for example, a service person.

A user whose privilege is "administrator" indicates a user who has an administrator privilege, which is a privilege to manage the image forming apparatus 10. The user whose privilege is "administrator" is, for example, a user in a position to manage the image forming apparatus 10 among users of the image forming apparatus 10.

A user whose privilege stored is neither "service" nor "administrator" is a user who uses the image forming apparatus 10 and does not have the service privilege nor the administrator privilege.

The display information storage area 164 stores display information of a device web page. The device web page is a web page serving as a user interface for displaying information of the image forming apparatus 10 and changing settings of the image forming apparatus 10. Note that, in the following description, the device web page is also simply referred to as a page. The display information is information (data) for displaying the device web page. Examples of the display information include data described in a markup language such as HyperText Markup Language (HTML), data described in a style sheet language such as Cascading Style Sheets (CSS), and data described in a script language such as JavaScript (trade name).

In the present embodiment, the device web page includes the following pages.

- Firmware update page allowing designation of a file to be used for the firmware update and instruction to update the firmware
- Display impossibility page indicating that the firmware update page cannot be displayed
- Status page for displaying status information indicating a progress status of the firmware update
- Firmware update completion page indicating completion of the firmware update In other words, the firmware update page is a page for the firmware update. Examples of the status information displayed on the status page include information including the progress rate of processing related to the firmware update and the remaining time of the firmware update. That is, the status page is a page for displaying a firmware update status.

In the present embodiment, the device web page displayed on the terminal apparatus 20 used by the user who has the administrator privilege is referred to as an administrator web page. The device web page displayed on the terminal apparatus 20 used by the user who has the service privilege is also referred to as a service web page. For example, an accessible page or displayable information may be different between the administrator web page and the service web page.

The RAM 170 is a main memory mainly used when the controller 100 of each apparatus executes processing. The RAM 170 is a rewritable memory that temporarily holds a program read from the storage of each apparatus or the ROM 180 of each apparatus and data including a result of the execution.

The ROM 180 is a non-volatile memory capable of holding the program and data even when the power is turned off. The ROM 180 is constituted by, for example, an electrically erasable programmable read-only memory (EE-PROM). The ROM 180 stores firmware 182.

The communicator 190 communicates with another apparatus or equipment such as the terminal apparatus 20 via a network such as a local area network (LAN) or a wide area network (WAN). The communicator 190 may be constituted by a communication device or a communication module such as a network interface card (NIC) used in a wired/wireless LAN, for example. Note that the communicator 190 may include an interface (network I/F) connectable to a network.

1.2.2 Terminal Apparatus

Figure 4:
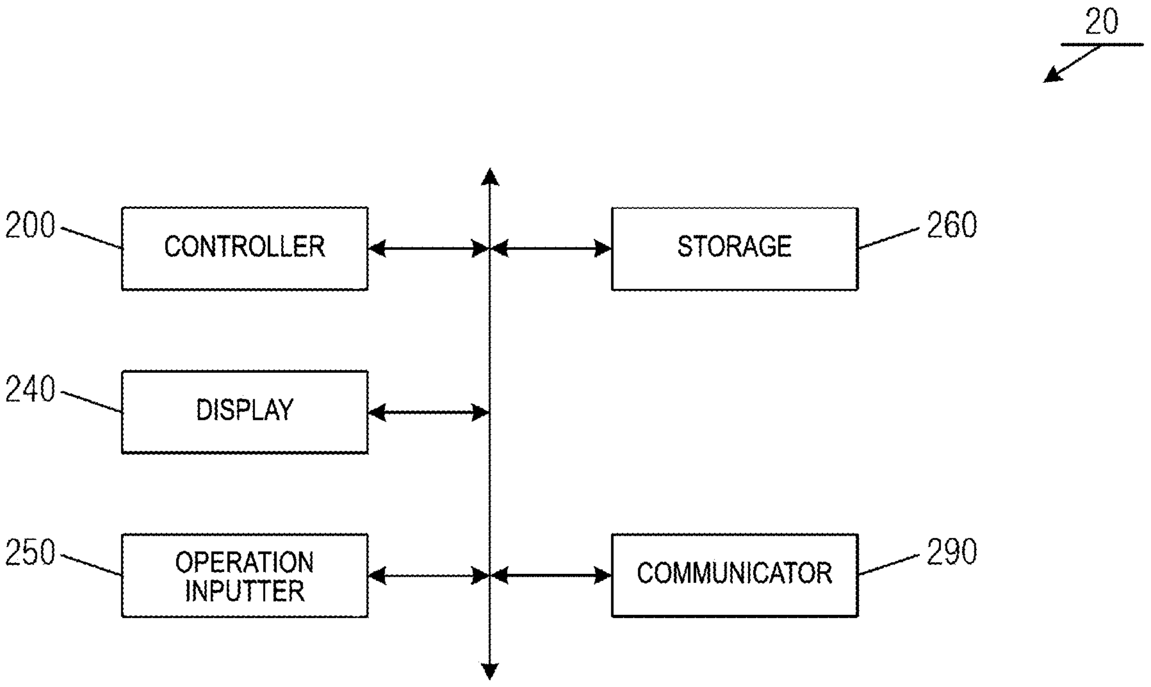
FIG. 4 is a diagram illustrating a functional configuration of a terminal apparatus of the first embodiment.

FIG. 4 is a diagram illustrating a functional configuration of the terminal apparatus 20. As illustrated in FIG. 4, the terminal apparatus 20 includes a controller 200, a display 240, an operation inputter 250, a storage 260, and a communicator 290.

The controller 200 controls the entirety of the terminal apparatus 20. The controller 200 realizes various functions by reading and executing various programs stored in the storage 260. The controller 200 may be constituted by, for example, one or a plurality of arithmetic devices (CPUs). The controller 200 may be configured as an SoC having a plurality of functions among the functions described below.

The display 240 displays various types of information. The display 240 may be constituted by, for example, a display device such as a liquid crystal display (LCD), an organic electro-luminescence (EL) display, or a micro light emitting diode (LED) display.

The operation inputter 250 receives an operation instruction from a user who uses the terminal apparatus 20. The operation inputter 250 may be constituted by an input device such as a key switch (hard key) or a touch sensor. A system for detecting an input by contact (touch) on the touch sensor may be a general detection system. Note that a touch panel in which the display 240 and the operation inputter 250 are integrally formed may be mounted at the terminal apparatus 20. The operation inputter 250 may be configured as an interface connectable to an input device such as a keyboard or a mouse.

The storage 260 stores various programs and various types of data necessary for the operation of the terminal apparatus 20. The storage 260 may be constituted by, for example, a storage device such as a ROM, a RAM, an SSD, or an HDD.

The communicator 290 communicates with an external apparatus such as the image forming apparatus 10 via a LAN or a WAN. The communicator 290 may be constituted by a communication device or a communication module such as a NIC used in a wired/wireless LAN, for example.

1.3 Processing Flow

Figure 6:
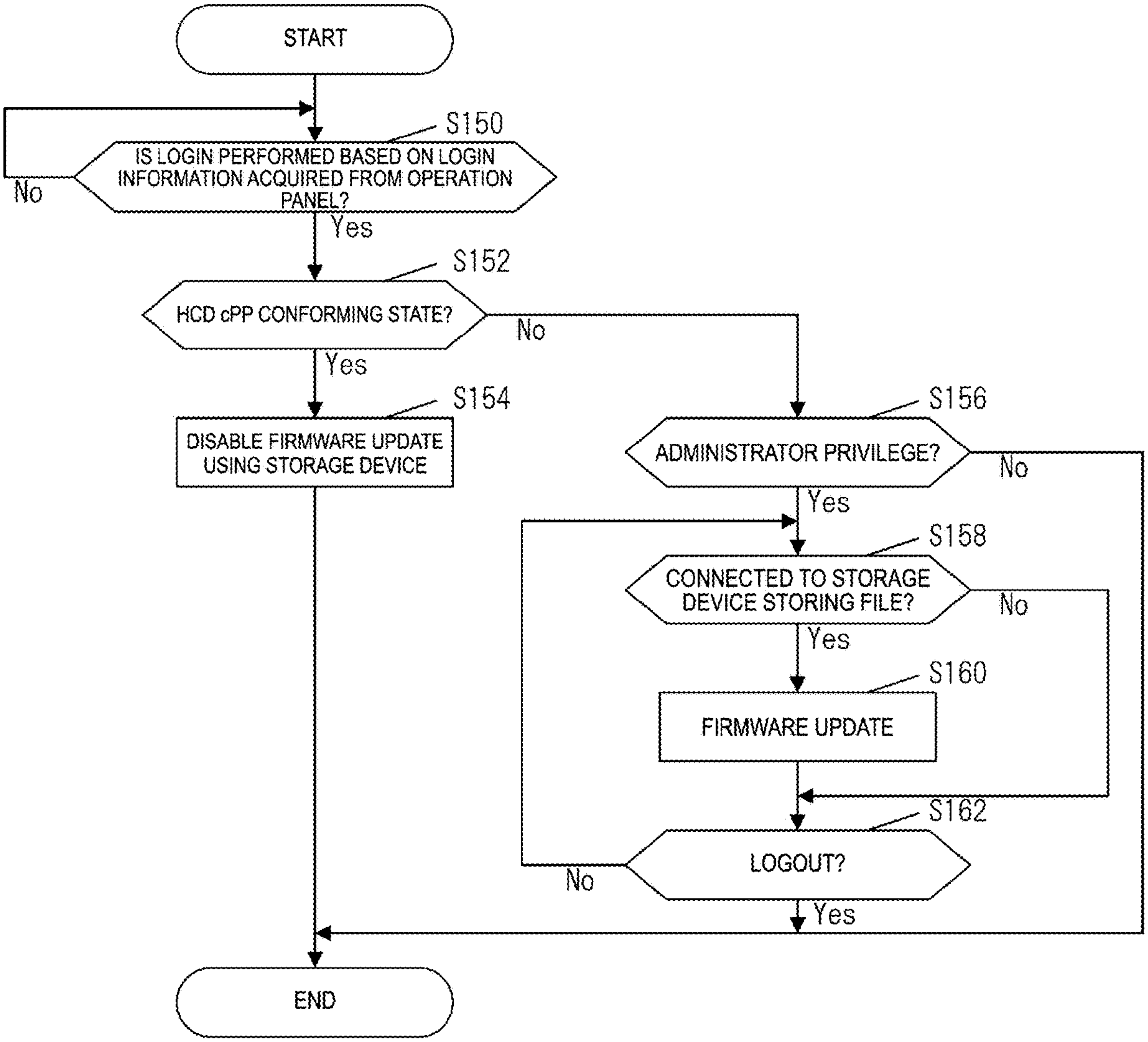
FIG. 6 is a flowchart of firmware update processing of the first embodiment.
Figure 7:
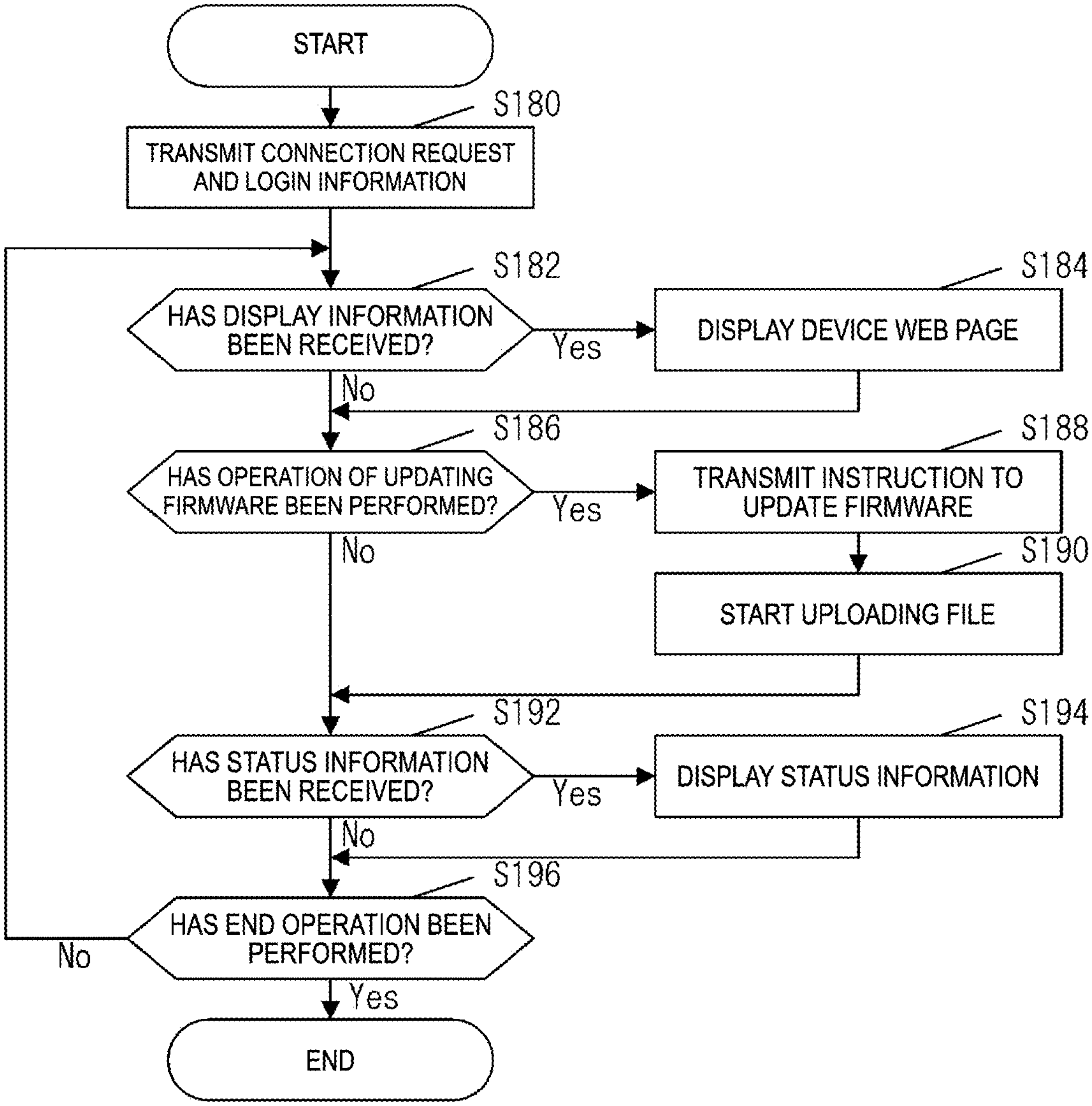
FIG. 7 is a flowchart of main processing of the terminal apparatus of the first embodiment.

Processing executed by the image forming apparatus 10 and the terminal apparatus 20 will be described with reference to FIGS. 5 to 7. Note that the user information and the display information are stored in advance. The image forming apparatus 10 and the terminal apparatus 20 communicate with each other using the TLS protocol.

1.3.1 Image Forming Apparatus 1.3.1.1 Main Processing

A flowchart of main processing executed by the controller 100 of the image forming apparatus 10 will be described with reference to FIG. 5.

First, the controller 100 determines whether the login processor 102 has received a connection request from the terminal apparatus 20 and login has been performed based on login information (also referred to as authentication information) received from the terminal apparatus 20 (step S100).

When the login is performed, the controller 100 reads display information of a page to be displayed after the login from the display information storage area 164 and transmits the display information to the terminal apparatus 20 that has transmitted the authentication information (Yes in step S100 and proceeding to step S102). Note that when determining that the user authentication has not been performed, the controller 100 omits the processing of step S102 (No in step S100).

Subsequently, the controller 100 determines whether access to a firmware update page has been requested from the terminal apparatus 20 (step S104). The access to the firmware update page is performed, for example, when the user instructs the terminal apparatus 20 to display the firmware update page.

When access to a page other than the firmware update page is requested via the terminal apparatus 20, the controller 100 transmits display information of the page requested to be accessed to the terminal apparatus 20 and returns to step S100 (No in step S104 and proceeding to step S106 and then to step S100).

On the other hand, when the access to the firmware update page is requested, the controller 100 determines whether the image forming apparatus 10 is in an HCD cPP conforming state, which is a state conforming to an HCD cPP requirement, which is an example of the security requirements (Yes in step S104 and proceeding to step S108). Note that the HCD cPP conforming state is also referred to as CPP_CONF (CONF is an abbreviation of conformant).

For example, the controller 100 determines whether the image forming apparatus 10 is in the HCD cPP conforming state based on the version of the firmware and the state and the setting contents of the image forming apparatus 10.

Note that when the image forming apparatus 10 is in the HCD cPP conforming state, a predetermined function is restricted, or settings related to the predetermined function are fixed to an enabled state or disabled state and cannot be changed. For example, when the image forming apparatus 10 is in the HCD cPP conforming state, the image forming apparatus 10 operates as follows.

- Due to the requirement "the user of the image forming apparatus 10 must be identified and authenticated before execution of document processing or a management function", settings relating to a user authentication function are fixed to an enabled state.
- Due to the requirement "the user of the image forming apparatus 10 must be identified and authenticated before execution of document processing or a management function", settings related to a user authentication function that does not use both user identification information and user authentication information are fixed to a disabled state.
- Due to the requirement "a security-related activity must be monitored and a log of such an action must be protected", settings related to a log monitoring function are fixed to an enabled state.

In the HCD cPP conforming state, the controller 100 determines whether the user who uses the terminal apparatus 20 that has requested the access to the firmware update page has the administrator privilege (Yes in step S108 and proceeding to step S110).

When the user has the administrator privilege, the controller 100 transmits display information of a first firmware update page (first display screen) to be displayed as the administrator web page to the terminal apparatus 20 used by the user (Yes in step S110 and proceeding to step S112).

Next, the controller 100 determines whether an instruction to update the firmware has been received from the terminal apparatus 20 (step S114).

When the instruction to update the firmware is received, the controller 100 transmits display information of a status page to the terminal apparatus 20 that has transmitted the instruction to update the firmware (Yes in step S114 and proceeding to step S116). Note that the controller 100 transmits either the display information of the status page to be displayed as the administrator web page or the display information of the status page to be displayed as the service web page to the terminal apparatus 20 in accordance with the privilege of the user who uses the terminal apparatus 20.

The controller 100 updates the firmware (step S118). For example, the controller 100 receives a file to be used for the firmware update from the terminal apparatus 20, converts, analyzes, and verifies the file, and stores firmware acquired based on the file in the ROM 180 as the firmware 182.

In addition, the controller 100 transmits status information to the terminal apparatus 20 that has transmitted the instruction to update the firmware (step S120).

Subsequently, the controller 100 determines whether the firmware update has completed (step S122). When the firmware update does not complete, the controller 100 returns to step S118 (No in step S122 and proceeding to step S118).

On the other hand, when the firmware update completes, the controller 100 transmits display information of a firmware update completion page to the terminal apparatus 20 that has transmitted the instruction to update the firmware (Yes in step S122 and proceeding to step S124). Note that, as in step S116, the controller 100 transmits, to the terminal apparatus 20, display information corresponding to the privilege of the user who uses the terminal apparatus 20.

Note that, in step S110, when the user who uses the terminal apparatus 20 that has requested the access to the firmware update page does not have the administrator privilege, the controller 100 transmits display information of a display impossibility page to the terminal apparatus 20 (No in step S110 and proceeding to step S126). That is, when the image forming apparatus 10 is in the HCD cPP conforming state, the controller 100 restricts transmission of the display information of the first firmware update page to the terminal apparatus 20 used by other than the user who has the administrator privilege. Accordingly, the first firmware update page displayed as the administrator web page is not displayed on the terminal apparatus 20 used by the user who has the service privilege or the terminal apparatus 20 used by the user who has neither the administrator privilege nor the service privilege.

In step S110, when the image forming apparatus 10 is not in the HCD cPP conforming state, the controller 100 determines whether the user who uses the terminal apparatus 20 that has requested the access to the firmware update page has the service privilege (No in step S108 and proceeding to step S128).

When the user has the service privilege, the controller 100 transmits display information of a second firmware update page (second display screen) to be displayed as the service web page to the terminal apparatus 20 used by the user (Yes in step S128 and proceeding to step S130). After executing the processing of step S130, the controller 100 executes the processing from step S114 to step S124.

On the other hand, when the user does not have the service privilege, the controller 100 transmits display information of a display impossibility page to the terminal apparatus 20 used by the user (No in step S128 and proceeding to step S132). That is, when the image forming apparatus 10 is not in the HCD cPP conforming state, the controller 100 restricts transmission of the display information of the second firmware update page to the terminal apparatus 20 used by other than the user who has the service privilege. Accordingly, the second firmware update page displayed as the service web page is not displayed on the terminal apparatus 20 used by the user who has the administrator privilege or the terminal apparatus 20 used by the user who has neither the administrator privilege nor the service privilege.

1.3.1.2 Firmware Update Processing

A flowchart of the firmware update processing will be described with reference to FIG. 6. The firmware update processing is executed in parallel with the main processing illustrated in FIG. 5.

First, the firmware update processor 104 determines whether login has been performed based on login information acquired by the login processor 102 from the operation panel 140 (step S150). Note that when the login is not performed, the firmware update processor 104 repeats the processing of step S150 (No in step S150).

Subsequently, when the login is performed, the firmware update processor 104 determines whether the image forming apparatus 10 is in the HCD cPP conforming state (Yes in step S150 and proceeding to step S152).

When the image forming apparatus 10 is in the HCD cPP conforming state, the firmware update processor 104 disables firmware update using a storage device (Yes in step S152 and proceeding to step S154). For example, even when a storage device is connected to the external interface 110, the firmware update processor 104 restricts an operation of the image forming apparatus 10 so as to prevent execution of processing such as reading data stored in the storage device.

On the other hand, when the image forming apparatus 10 is not in the HCD cPP conforming state, the firmware update processor 104 determines whether the user who has logged in in step S150 has the administrator privilege (No in step S152 and proceeding to step S156).

When the user has the administrator privilege, the firmware update processor 104 determines whether a storage device storing a file to be used for the firmware update is connected to the external interface 110 (Yes in step S156 and proceeding to step S158).

When the storage device storing the file to be used for the firmware update is connected, the firmware update processor 104 updates the firmware using the file (Yes in step S158 and proceeding to step S160). The processing of step S160 is the same as that of step S118.

Subsequently, the firmware update processor 104 determines whether the user who has been authenticated in step S150 has logged out (step S162). When the user logs out, the firmware update processor 104 ends the processing illustrated in FIG. 6 (Yes in step S162). On the other hand, when the user does not log out, the firmware update processor 104 returns to step S158 (No in step S162 and proceeding to step S158).

Note that when determining in step S156 that the user does not have the administrator privilege, the firmware update processor 104 omits the processing from step S158 to step S162 (No in step S156).

By executing the above-described processing, the user who has the administrator privilege can update the firmware using the storage device such as a USB memory stick when the image forming apparatus 10 is not in the HCD cPP conforming state.

1.3.2 Terminal Apparatus

A flowchart of main processing executed by the controller 200 of the terminal apparatus 20 will be described with reference to FIG. 7.

First, the controller 200 transmits a connection request to the image forming apparatus 10 and login information to the image forming apparatus 10 in response to a user operation (step S180). For example, the controller 200 displays a screen for inputting the login information on the display 240, causes the user to input the login information via the screen, and transmits, to the image forming apparatus 10, the input login information together with the connection request to the image forming apparatus 10.

Subsequently, when display information is received from the image forming apparatus 10, the controller 200 displays a device web page on the display 240 based on the display information (Yes in step S182 and proceeding to step S184). For example, when display information of a first firmware update page is received from the image forming apparatus 10, the controller 200 can display the first firmware update page. Similarly, when display information of a second firmware update page is received from the image forming apparatus 10, the controller 200 can display the second firmware update page. When display information of a processing page or a firmware update completion page is received from the image forming apparatus 10, the controller 200 displays the processing page or the firmware update completion page based on the received display information. Note that the controller 200 displays a device web page such as the firmware update page on a web browser or the like. When no display information is received from the image forming apparatus 10, the controller 200 omits the processing of step S184 (No in step S182).

Subsequently, the controller 200 determines whether the user has performed an operation of updating the firmware (step S186). When the operation of updating the firmware is performed, the controller 200 transmits an instruction to update the firmware to the image forming apparatus 10 (Yes in step S186 and proceeding to step S188). In addition, the controller 200 starts uploading a file to be used for the firmware update to the image forming apparatus 10 (step S190). On the other hand, when the operation of updating the firmware is not performed, the controller 200 omits the processing of step S188 and step S190 (No in step S186).

Subsequently, the controller 200 determines whether status information has been received (step S192). When the status information is received from the image forming apparatus 10, the controller 200 displays a firmware update status by displaying the status information (Yes in step S192 and proceeding to step S194). For example, when the status information is received while the status page is being displayed, the controller 200 executes any of the following processing operations.

(1) The status information included in the status page is automatically updated based on the received status information (the status page is updated only partially).

(2) The displayed status page is automatically updated to a new status page reflecting the received status information (the status page itself is updated).

Subsequently, the controller 200 determines whether an end operation has been performed (step S196). Examples of the end operation include an operation of logout from the image forming apparatus 10 and an operation of ending use of the terminal apparatus 20. When the end operation is performed, the controller 200 ends the processing illustrated in FIG. 7 (Yes in step S196). When the end operation is not performed, the controller 200 returns to step S182 (No in step S196 and proceeding to step S182).

Note that when an operation other than the operation of updating the firmware is performed by the user as processing other than the above-described processing, the controller 200 executes processing corresponding to the operation performed by the user. For example, when the user performs an operation of accessing another device web page, the controller 200 requests access to this device web page to the image forming apparatus 10.

1.4 Operation Example

FIG. 8 is a table showing the correspondence between whether the image forming apparatus 10 is in the HCD cPP conforming state, the privilege of the user, and whether it is possible to display the firmware update page. As illustrated in FIG. 8, in the case where the image forming apparatus 10 is in the HCD cPP conforming state, the firmware update page is displayed when the user has the administrator privilege, and the firmware update page is not displayed when the user does not have the administrator privilege. Similarly, in the case where the image forming apparatus 10 is not in the HCD cPP conforming state, the firmware update page is displayed when the user has the service privilege, and the firmware update page is not displayed when the user does not have the service privilege.

Note that even when the image forming apparatus 10 has a function of displaying the device web page on the operation panel 140, the firmware update page does not need to be displayed on the image forming apparatus 10. This restricts the firmware update using the operation panel 140 and only enables the firmware update from the terminal apparatus 20 on the LAN.

Figure 9A:
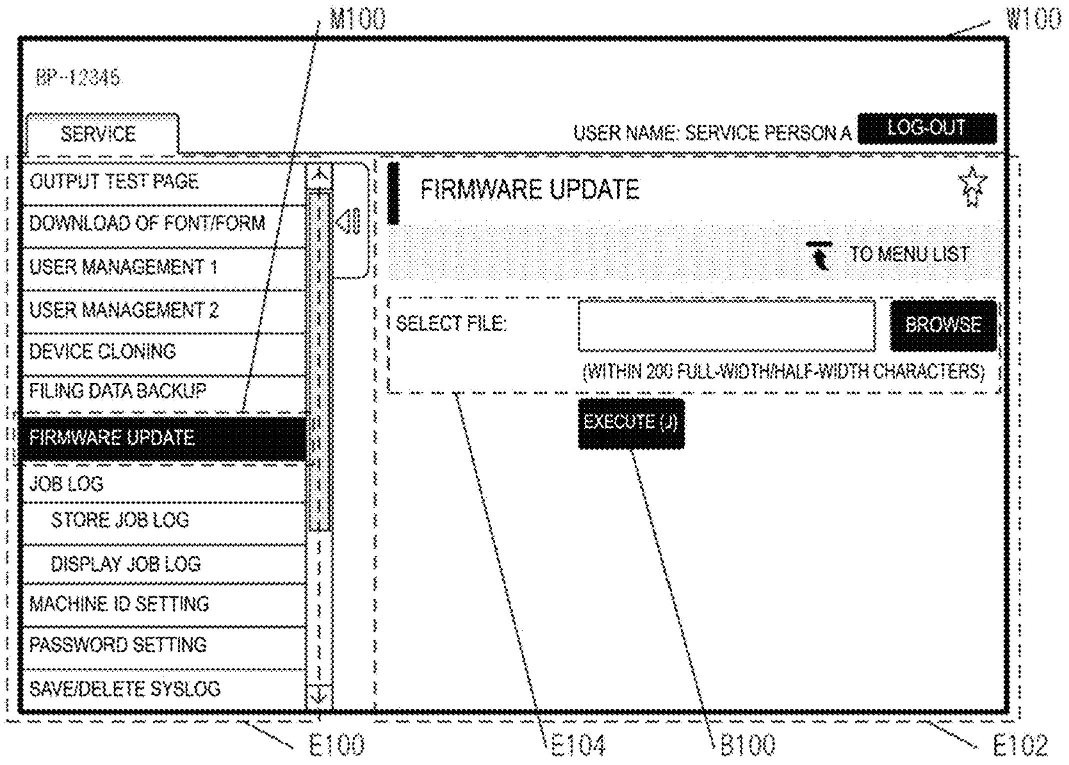
FIG. 9A and FIG. 9B are diagrams illustrating an operation example of the first embodiment.

FIG. 9A is a diagram illustrating a display example of a second firmware update page W100. The second firmware update page W100 includes, for example, an area E100 for displaying a menu and an area E102 for displaying a content corresponding to an item selected from the menu. The menu includes an item M100 for requesting access to the firmware update page. When the item M100 in a non-selected state is selected, access to the firmware update page is requested from the terminal apparatus 20 to the image forming apparatus 10, and the second firmware update page W100 is displayed on the terminal apparatus 20.

The second firmware update page W100 includes, as contents, an area E104 for selecting a file to be used for the firmware update and a button B100 for receiving an operation of updating the firmware, as illustrated in the area E102. The user can transmit an instruction to update the firmware to the image forming apparatus 10 by selecting the file and selecting the button B100.

Figure 9B:
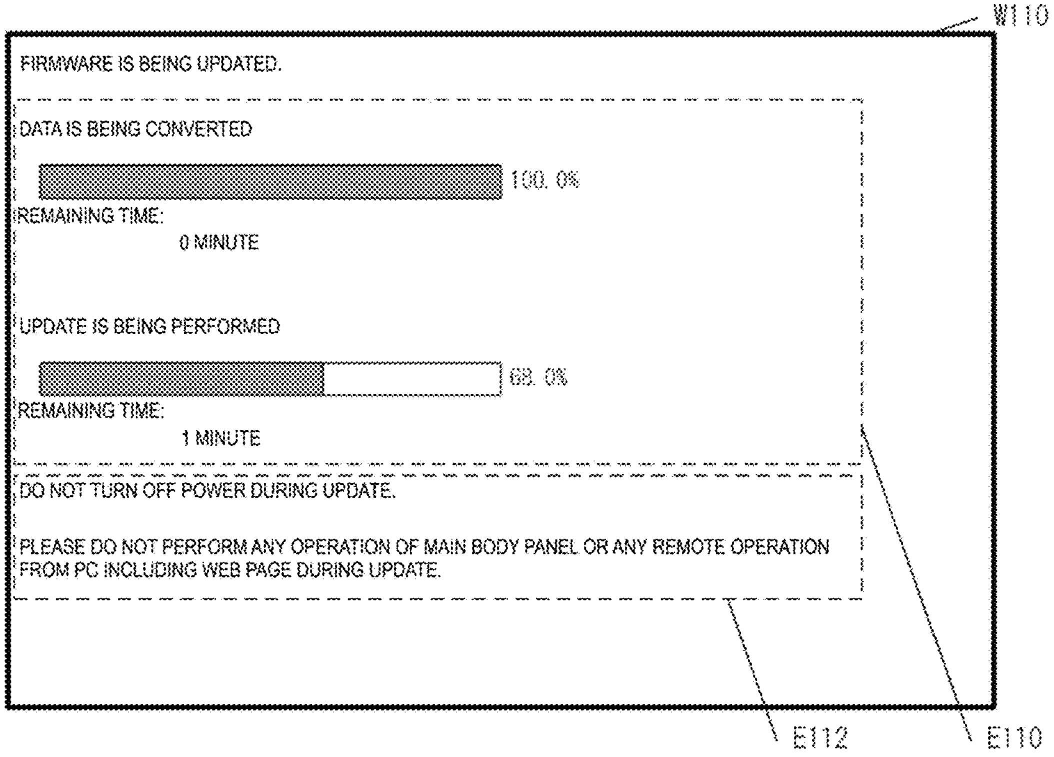

FIG. 9B is a diagram illustrating a screen example of a screen W110 displayed on the operation panel 140 of the image forming apparatus 10 when the firmware is being updated. The screen W110 includes, for example, an area E110 for displaying a graph indicating the progress status of the processing, and an area E112 for displaying a message to the user.

Figure 10A:
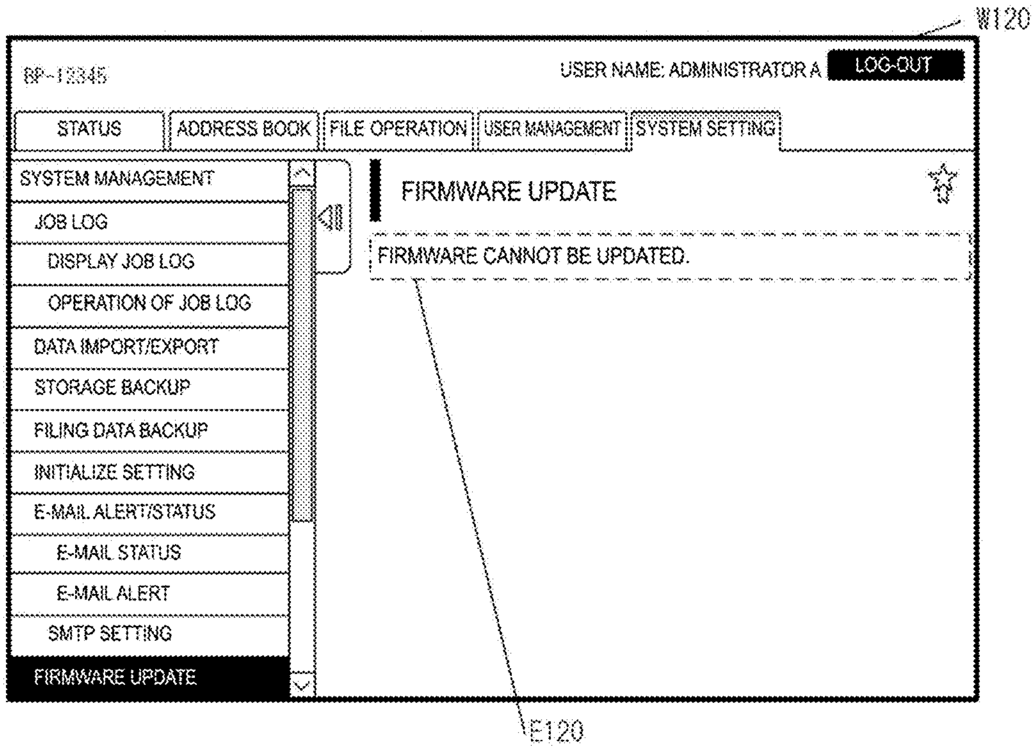
FIG. 10A and FIG. 10B are diagrams illustrating an operation example of the first embodiment.

FIG. 10A is a diagram illustrating a display example of a display impossibility page W120. In particular, when the image forming apparatus 10 is not in the HCD cPP conforming state, the display impossibility page W120 is displayed on the terminal apparatus 20 used by the user who does not have the service privilege. The display impossibility page W120 includes, for example, an area E120 for displaying a message indicating that the firmware cannot be updated.

Figure 10B:
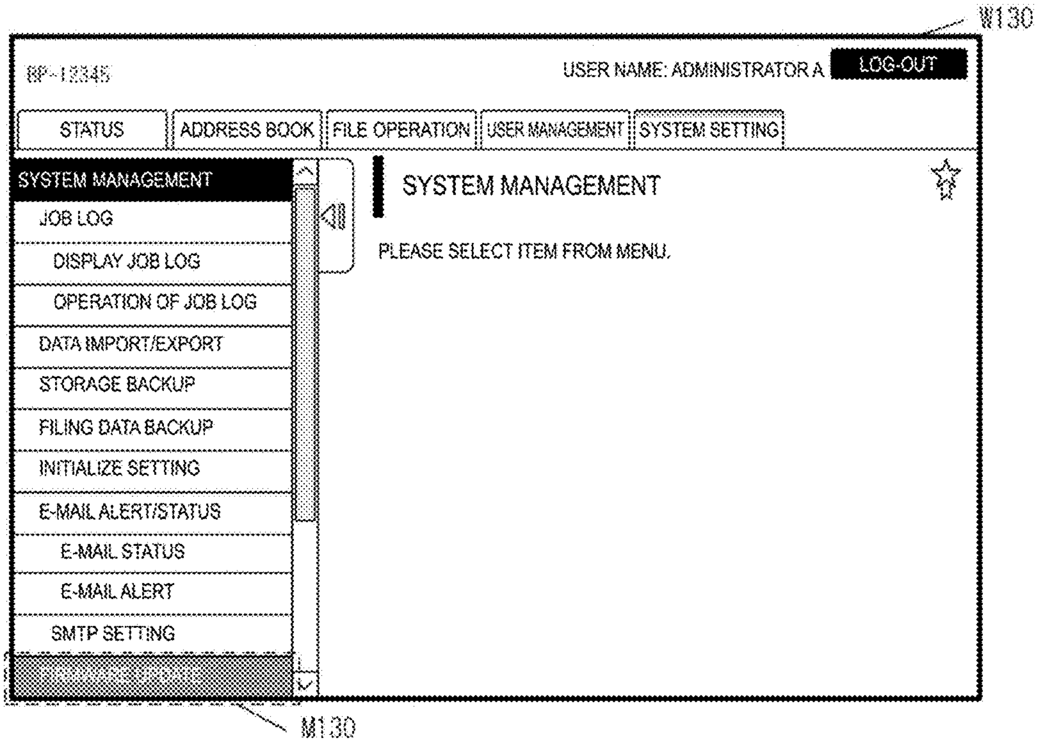

Note that when the image forming apparatus 10 is not in the HCD cPP conforming state, an item for requesting access to the firmware update page may be unselectable from a menu of a device web page displayed on the terminal apparatus 20 used by the user who does not have the service privilege. For example, FIG. 10B is a diagram illustrating a device web page W130 when an item M130 for requesting access to the firmware update page is unselectable. For example, as illustrated in FIG. 10B, the item M130 is grayed out and is unselectable. Accordingly, the user who does not have the service privilege cannot access the firmware update page and cannot update the firmware. Note that the item M130 may be unselectable by being hidden. In addition, the item M130 may be made substantially unselectable by displaying a message indicating that the firmware update page cannot be accessed and restricting transition to the firmware update page when the item M130 is selected by the user.

Figure 11:
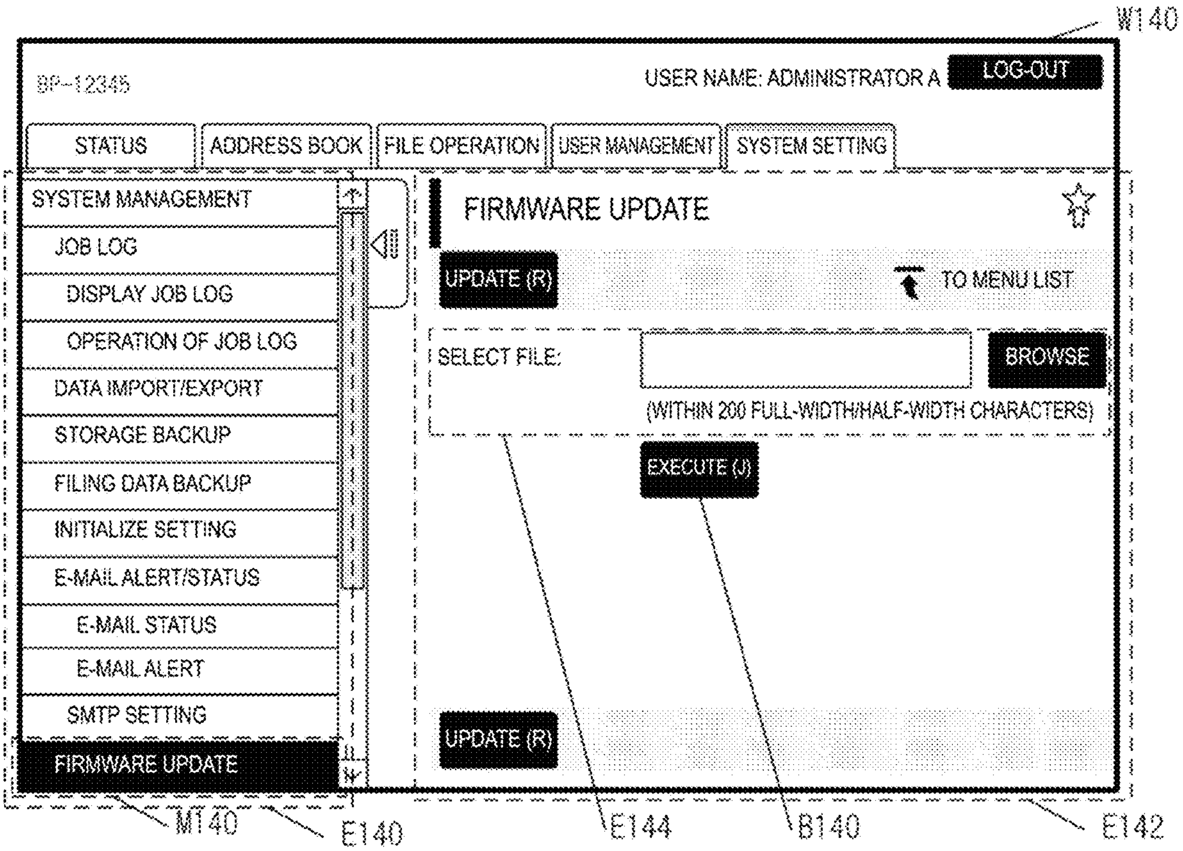
FIG. 11 is a diagram illustrating an operation example of the first embodiment.

FIG. 11 is a diagram illustrating a display example of a first firmware update page W140. In a manner similar to the second firmware update page W100 illustrated in FIG. 9A, the first firmware update page W140 includes an area E140 for displaying a menu and an area E142 for displaying a content corresponding to an item selected from the menu. The menu includes an item M140 for requesting access to the first firmware update page.

The first firmware update page W140 includes, as contents, an area E144 for selecting a file to be used for the firmware update and a button B140 for receiving an operation of updating the firmware as illustrated in the area E142. The user can transmit an instruction to update the firmware to the image forming apparatus 10 by selecting the file and selecting the button B140.

Note that items and the like displayed in the menu may be different between the second firmware update page W100 and the first firmware update page W140.

Figure 12A:
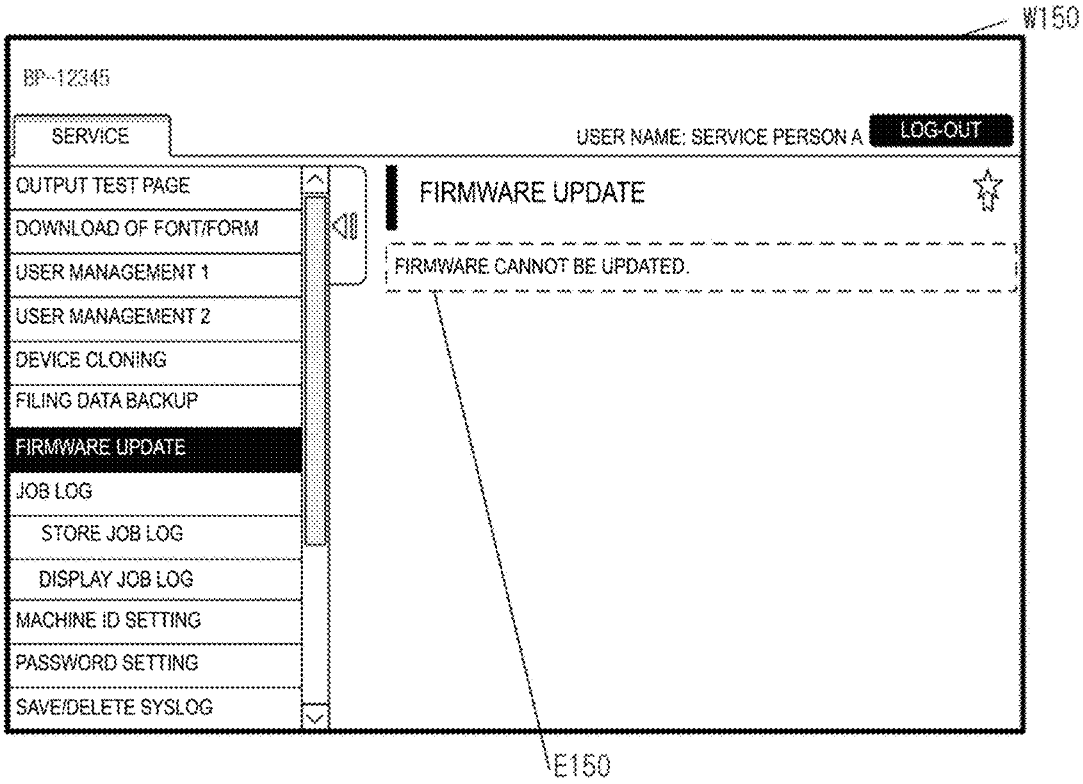
FIG. 12A and FIG. 12B are diagrams illustrating an operation example of the first embodiment.

FIG. 12A is a diagram illustrating a display example of a display impossibility page W150. In particular, when the image forming apparatus 10 is in the HCD cPP conforming state, the display impossibility page W150 is displayed on the terminal apparatus 20 used by the user who does not have the administrator privilege. The display impossibility page W150 includes, for example, an area E150 for displaying a message indicating that the firmware cannot be updated.

Figure 12B:
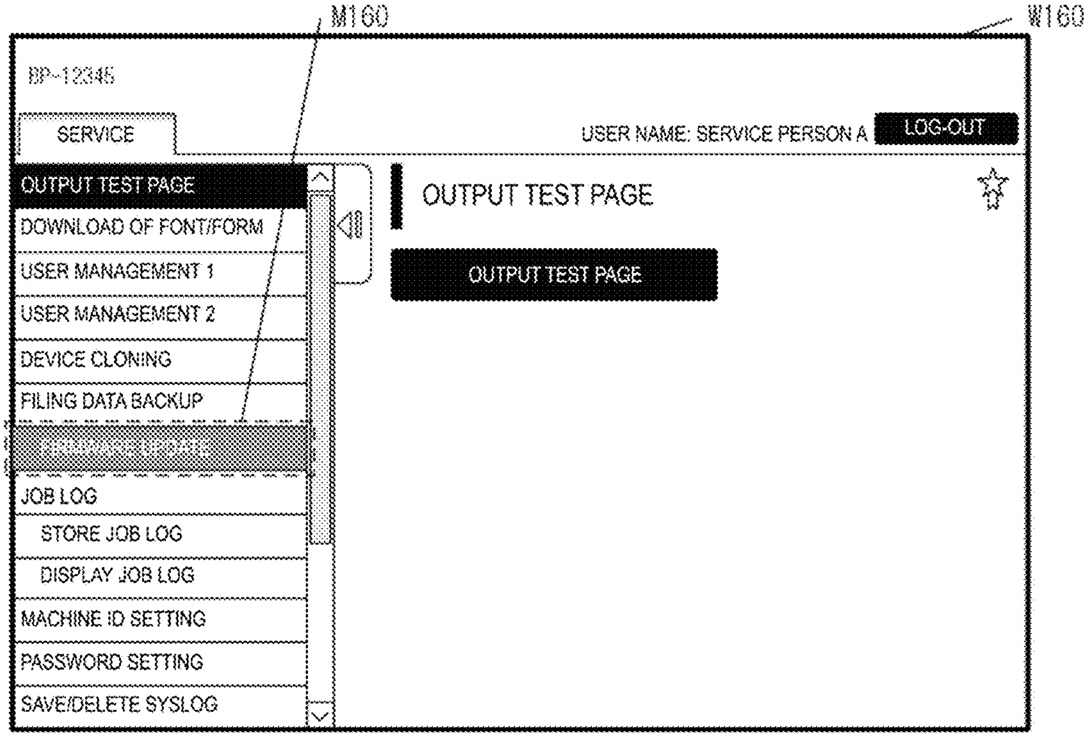

Note that when the image forming apparatus 10 is in the HCD cPP conforming state, an item for requesting access to the firmware update page may be unselectable from a menu of a device web page displayed on the terminal apparatus 20 used by the user who does not have the administrator privilege. For example, FIG. 12B is a diagram illustrating a device web page W160 when an item M160 for requesting access to the firmware update page is unselectable. For example, as illustrated in FIG. 12B, the item M160 is grayed out and is unselectable. As a result, the user who does not have the administrator privilege cannot access the firmware update page and cannot update the firmware. Note that the item M160 may be unselectable by being hidden. In addition, the item M160 may be made substantially unselectable by displaying a message indicating that the firmware update page cannot be accessed and restricting transition to the firmware update page when the item M160 is selected by the user.

Figure 13A:
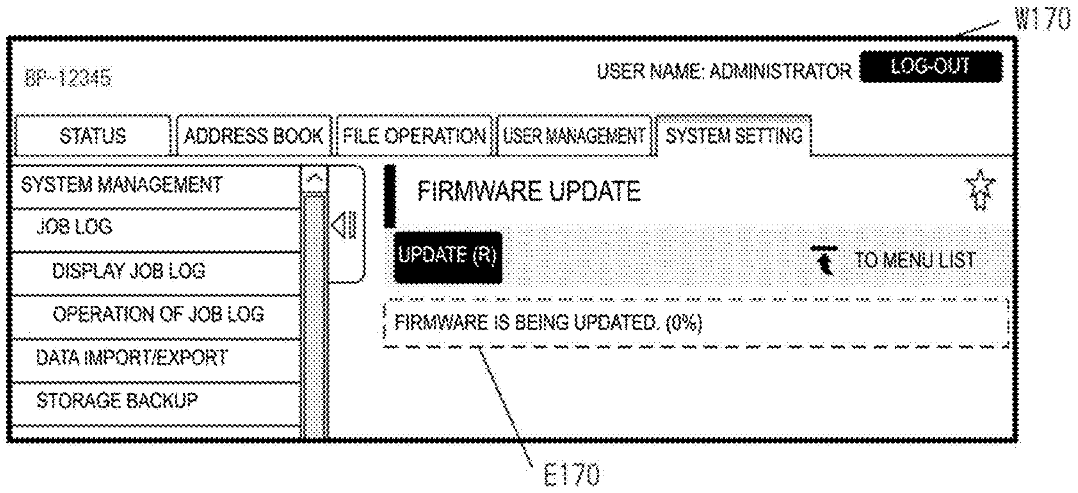
FIG. 13A and FIG. 13B and FIG. 13C are diagrams illustrating an operation example of the first embodiment.

FIG. 13A is a diagram illustrating an example of a status page W170. The status page W170 includes an area E170 for displaying status information. For example, the area E170 includes the progress rate of the firmware update as the status information, and the progress rate is automatically updated.

Figure 13B:
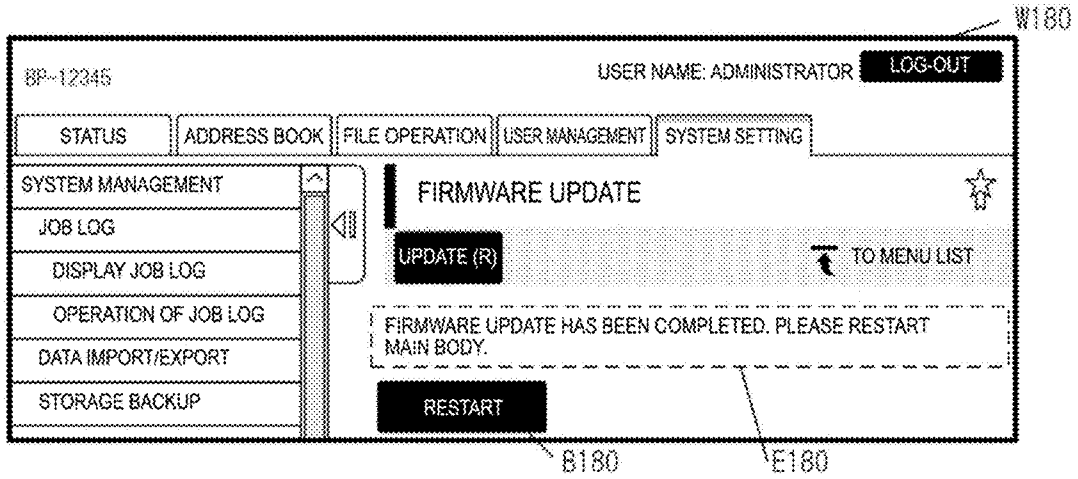

FIG. 13B is a diagram illustrating a display example of a firmware update completion page W180. The firmware update completion page W180 includes an area E180 for displaying a message indicating that the firmware update has completed and a button B180 for giving an instruction to restart the image forming apparatus 10.

Figure 13C:
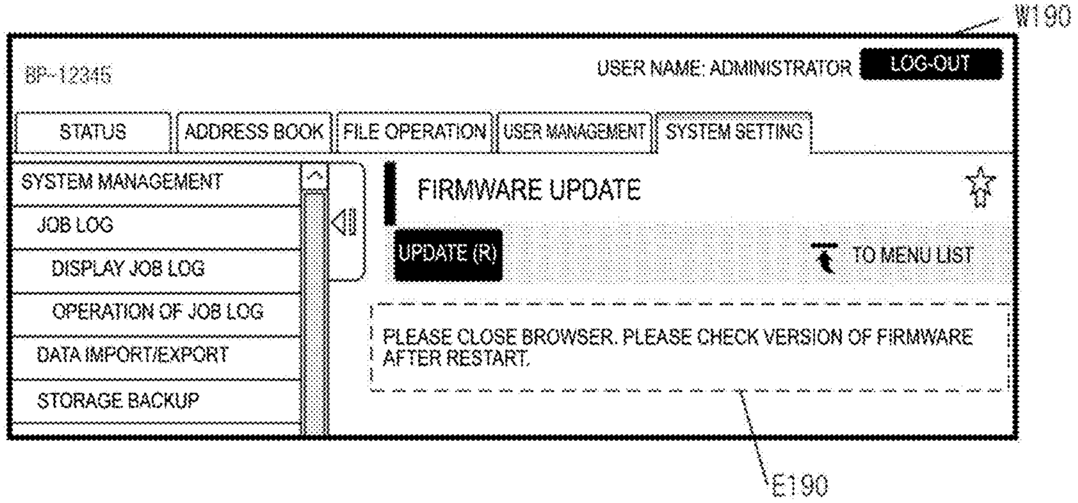

In addition, after the instruction to restart the image forming apparatus 10 is given by selecting the button B180 included in the firmware update completion page W180, an instruction to the user may be displayed. For example, after the button B180 is selected, as illustrated in FIG. 13C, a device web page W190 including an area E190 for displaying a message prompting the user to close the browser and a message prompting the user to check the version of the firmware may be displayed.

Note that the administrator privilege does not need to be set for each user. For example, an administrator privilege group may be set, and any user belonging to the administrator privilege group may have the administrator privilege. When the image forming apparatus 10 is in the HCD cPP conforming state, the login of the user who has the administrator privilege is essential. However, when the password is erroneously input and the total number of times of erroneous input is equal to or more than a predetermined number, the login of the user may be locked.

In addition, when a device not on the LAN (a device on a cloud outside a firewall) is used, the controller 100 may disable the firmware update.

In this manner, according to the present embodiment, even when the image forming apparatus is in the HCD cPP conforming state, the user who has the administrator privilege can operate the terminal apparatus, communicate with the image forming apparatus using the TLS protocol, and update the firmware from the administrator web page. That is, the image forming apparatus according to the present embodiment performs secure communication using the TLS protocol in the HCD cPP conforming state, requires login of the user who has the administrator privilege, and enables the firmware update when the device on the LAN is used. As a result, the image forming apparatus according to the present embodiment can provide the user who has the administrator privilege with a function equivalent to the firmware update function usable by the service person. On the other hand, in the present embodiment, when the image forming apparatus is in the HCD cPP conforming state, the firmware update by the user who has the service privilege such as the service person and the firmware update using a USB memory stick are disabled. As a result, the image forming apparatus of the present embodiment can appropriately update the firmware while satisfying the HCD cPP requirements.

On the other hand, in the present embodiment, when the image forming apparatus is not in the HCD cPP conforming state, the user who has the service privilege such as the service person can update the firmware, and the user who has the administrator privilege can update the firmware using a USB memory stick. On the other hand, when the image forming apparatus is not in the HCD cPP conforming state, the user who has the administrator privilege cannot update the firmware from the administrator web page. In this manner, the image forming apparatus according to the present embodiment can switch the firmware update means in accordance with whether the image forming apparatus conforms to the HCD cPP and can prevent the user from being confused by providing the user with a plurality of types of firmware update means.

2. Second Embodiment

In a second embodiment, whether to display the firmware update status on the terminal apparatus used by the user who has the administrator privilege is selectable in the processing described in the first embodiment. In the present embodiment, FIG. 5 of the first embodiment is replaced with FIG. 14, and FIG. 7 of the first embodiment is replaced with FIG. 15. Note that the same processing is denoted by the same reference numeral, and description thereof is omitted.

2.1 Processing Flow

2.1.1 Image Forming Apparatus

Figure 14:
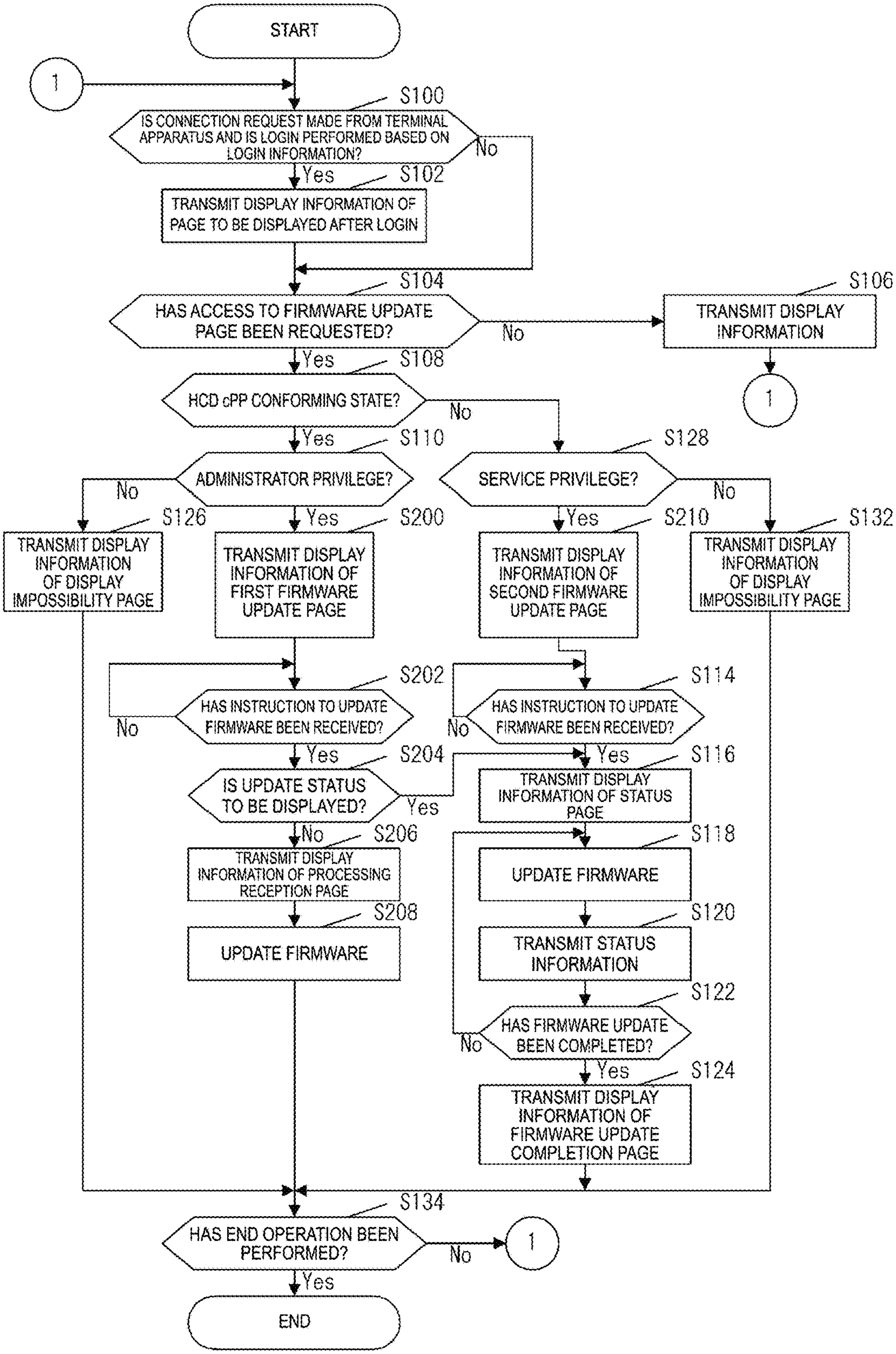
FIG. 14 is a flowchart of main processing of an image forming apparatus of a second embodiment.

FIG. 14 is a flowchart of main processing executed by the controller 100 of the image forming apparatus 10 of the present embodiment. In the present embodiment, when it is determined in step S110 that the user has the administrator privilege, the controller 100 transmits display information of a first firmware update page to be displayed as the administrator web page to the terminal apparatus 20 used by the user (step S200). Here, the first firmware update page of the present embodiment includes a selection item for allowing selection of whether to display a firmware update status. The selection item is displayed as, for example, a user interface (UI) such as a check box.

Next, the controller 100 determines whether an instruction to update the firmware has been received from the terminal apparatus 20 (step S202). At this time, the controller 100 determines whether to display the firmware update status (step S204). For example, the controller 100 receives information indicating whether to display the firmware update status together with the instruction to update the firmware from the terminal apparatus 20 and determines whether to display the firmware update status based on this information.

When the firmware update status is to be displayed, the controller 100 executes the processing from step S116 to step S124 (Yes in step S204). Accordingly, the controller 100 can cause the terminal apparatus 20 to display a status page and automatically update the status page.

On the other hand, when the firmware update status is not to be displayed, the controller 100 transmits display information of a processing reception page to the terminal apparatus 20 that has transmitted the instruction to update the firmware (No in step S204 and proceeding to step S206). The processing reception page is one device web page and is a page indicating reception of the firmware update processing. Unlike the processing page, the processing reception page does not display the firmware update status and is not automatically updated. The controller 100 updates the firmware (step S208). The processing of step S208 is the same as the processing of step S118.

On the other hand, when it is determined in step S128 that the user has the service privilege, the controller 100 transmits display information of a second firmware update page to be displayed as the service web page to the terminal apparatus 20 used by the user (step S210). Here, the second firmware update page according to the present embodiment does not include an item for switching whether to automatically update the status page.

In addition, after the processing of step S210, the controller 100 executes the processing from step S114 to step S124 as in the first embodiment.

2.1.2 Terminal Apparatus

Figure 15:
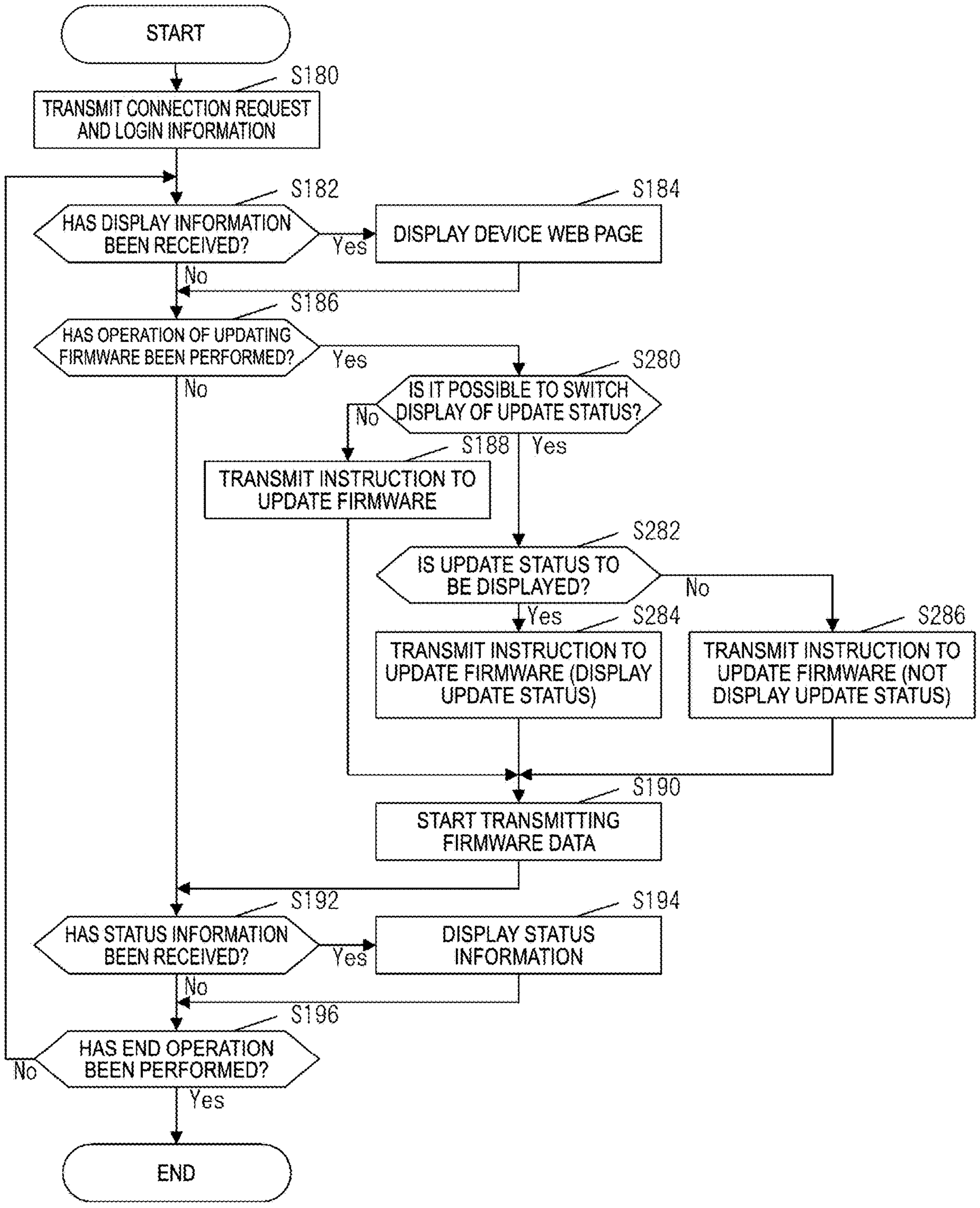
FIG. 15 is a flowchart of main processing of a terminal apparatus of the second embodiment.

FIG. 15 is a flowchart of main processing executed by the controller 200 of the terminal apparatus 20 according to the present embodiment.

In the present embodiment, when an operation of updating the firmware is performed by the user, the controller 200 determines whether it is possible to switch whether to display the firmware update status on the firmware update page displayed on the display 240 (step S280).

When it is possible to switch whether to display the firmware update status, that is, when the first firmware update page is displayed, the controller 200 determines whether to display the firmware update status (Yes in step S280 and proceeding to step S282).

When the firmware update status is to be displayed, the controller 200 transmits, to the image forming apparatus 10, an instruction to update the firmware together with information indicating that the firmware update status is to be displayed (Yes in step S282 and proceeding to step S284).

On the other hand, when the firmware update status is not to be displayed, the controller 200 transmits, to the image forming apparatus 10, an instruction to update the firmware together with information indicating that the firmware update status is not to be displayed (No in step S282 and proceeding to step S286).

When it is determined in step S280 that it is not possible to switch whether to display the firmware update status, that is, when the second firmware update page is displayed, the controller 200 transmits an instruction to update the firmware to the image forming apparatus 10 (No in step S280 and proceeding to step S188).

2.2 Operation Examples

Figure 16:
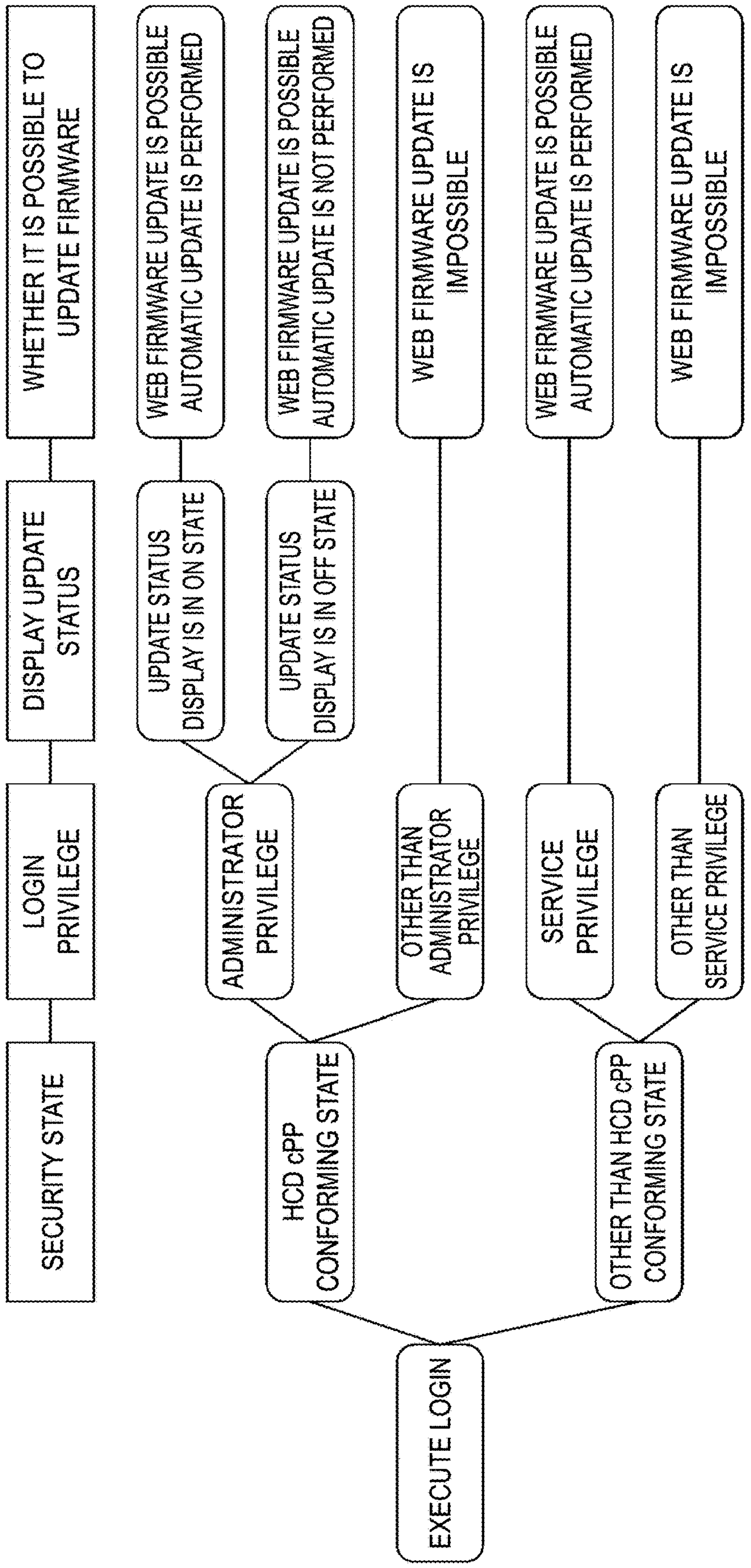
FIG. 16 is a diagram illustrating conditions of whether it is possible to update firmware and whether to perform automatic update in the second embodiment.

FIG. 16 is a diagram illustrating conditions of whether it is possible to update the firmware and whether to perform automatic update in the present embodiment. As illustrated in FIG. 16, after execution of login, any of the following five situations arises in accordance with whether the image forming apparatus 10 is in the HCD cPP conforming state, the privilege of the user, and whether display of the firmware update status is in the ON state or OFF state.

(1) When the image forming apparatus 10 is in the HCD cPP conforming state, the user has the administrator privilege, and the update status display is in the ON state, the firmware update via the device web page is possible, and the device web page is automatically updated (the firmware update status is displayed).

(2) When the image forming apparatus 10 is in the HCD cPP conforming state, the user has the administrator privilege, and the update status display is in the OFF state, the firmware update via the device web page is possible, and the device web page is not automatically updated (the firmware update status is not displayed).

(3) When the image forming apparatus 10 is in the HCD cPP conforming state and the user does not have the administrator privilege, the firmware cannot be updated.

(4) When the image forming apparatus 10 is in a state other than the HCD cPP conforming state and the user has the service privilege, the firmware update via the device web page is possible, and the device web page is automatically updated (the firmware update status is displayed).

(5) When the image forming apparatus 10 is in a state other than the HCD cPP conforming state and the user does not have the service privilege, the firmware cannot be updated.

Figure 17A:
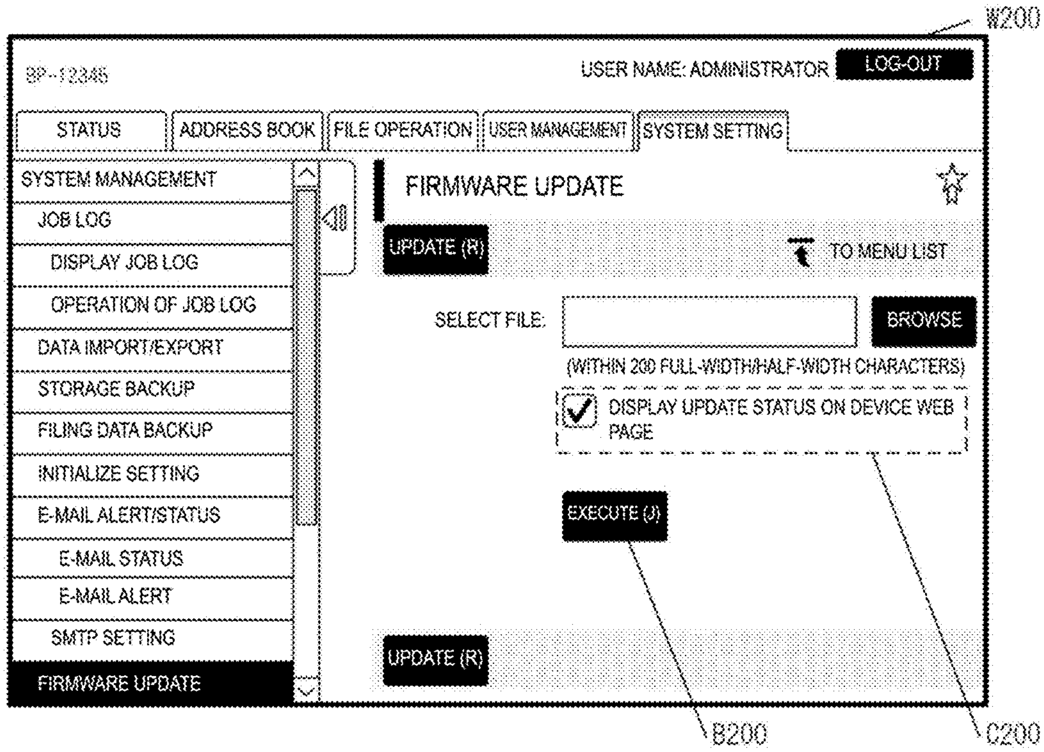
FIG. 17A and FIG. 17B are diagrams illustrating an operation example of the second embodiment.

FIG. 17A illustrates a display example of a first firmware update page W200 according to the present embodiment. The first firmware update page W200 includes a check box C200 as a selection item for switching whether to display the firmware update status. The check box C200 in the ON state indicates that the firmware update status (status page) is to be displayed and automatically updated. On the other hand, the check box C200 in the OFF state indicates that the firmware update status (status page) is not to be displayed.

In addition, the first firmware update page W200 includes a button B200 for giving an instruction to update the firmware. By switching the selection state of the check box C200 and then selecting the button B200 for giving the instruction to update the firmware, the user can update the firmware of the image forming apparatus 10 after selecting whether to display the firmware update status on the terminal apparatus 20.

Figure 17B:
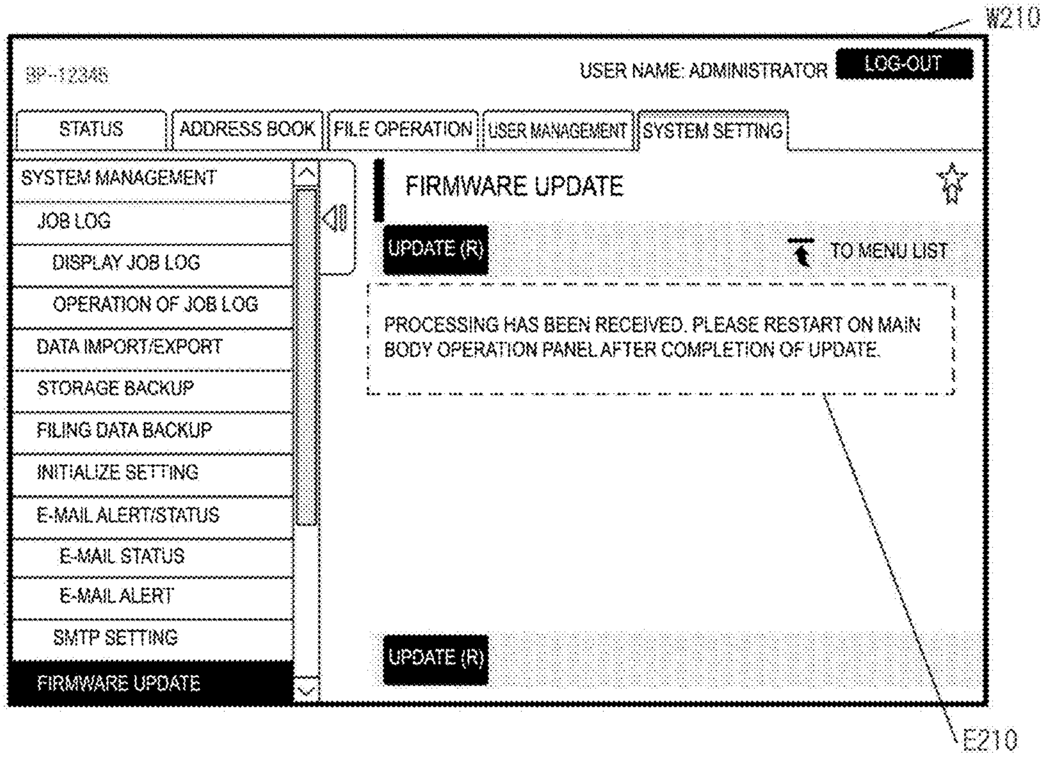

When the check box C200 is in the OFF state and the button B200 is selected on the first firmware update page W200, a processing reception page W210 illustrated in FIG. 17B is displayed on the terminal apparatus 20.

The processing reception page W210 includes an area E210 for displaying a message indicating reception of the firmware update processing. The message displayed in the area E210 is fixed and is not automatically updated. In addition, the area E210 may include, for example, a message prompting the user to check the operation panel 140. Accordingly, the user can check the progress status of the firmware update by checking the screen (for example, the screen W110 illustrated in FIG. 9B) displayed on the operation panel 140.

Note that when the check box C200 is in the ON state and the button B200 is selected on the first firmware update page W200, the status page W170 illustrated in FIG. 13A of the first embodiment is displayed. Note that the default state of the check box C200 may be the ON state, or the default selection state may be determined in association with the user.

When the user that uses the terminal apparatus 20 has the service privilege, the second firmware update page W100 illustrated in FIG. 9A of the first embodiment is displayed. The second firmware update page W100 does not include an item for switching whether to automatically update the status page. After execution of the firmware update, the status page W170 as illustrated in FIG. 13A is displayed, and the progress rate of the firmware update is automatically updated.

In this manner, in the present embodiment, it is possible to switch whether to display the firmware update status on the firmware update page displayed on the terminal apparatus used by the user who has the administrator privilege. Thus, the image forming apparatus according to the present embodiment suppresses the status page automatically updated being displayed on the terminal apparatus and causes the processing reception page not automatically updated to be displayed on the terminal apparatus. Thus, it is possible to display the device web page in consideration of accessibility. As described above, according to the present embodiment, it is possible to provide the device web page that is not inferior to the related art in terms of accessibility measures.

As a result, in the present embodiment, it is possible to display the device web page that satisfies accessibility standards such as the voluntary product accessibility template (VPAT) and that has usability for the user who has the administrator privilege.

3. Third Embodiment

In a third embodiment, an attention message related to the firmware update is displayed on the first firmware update page described in the first embodiment.

Figure 5:
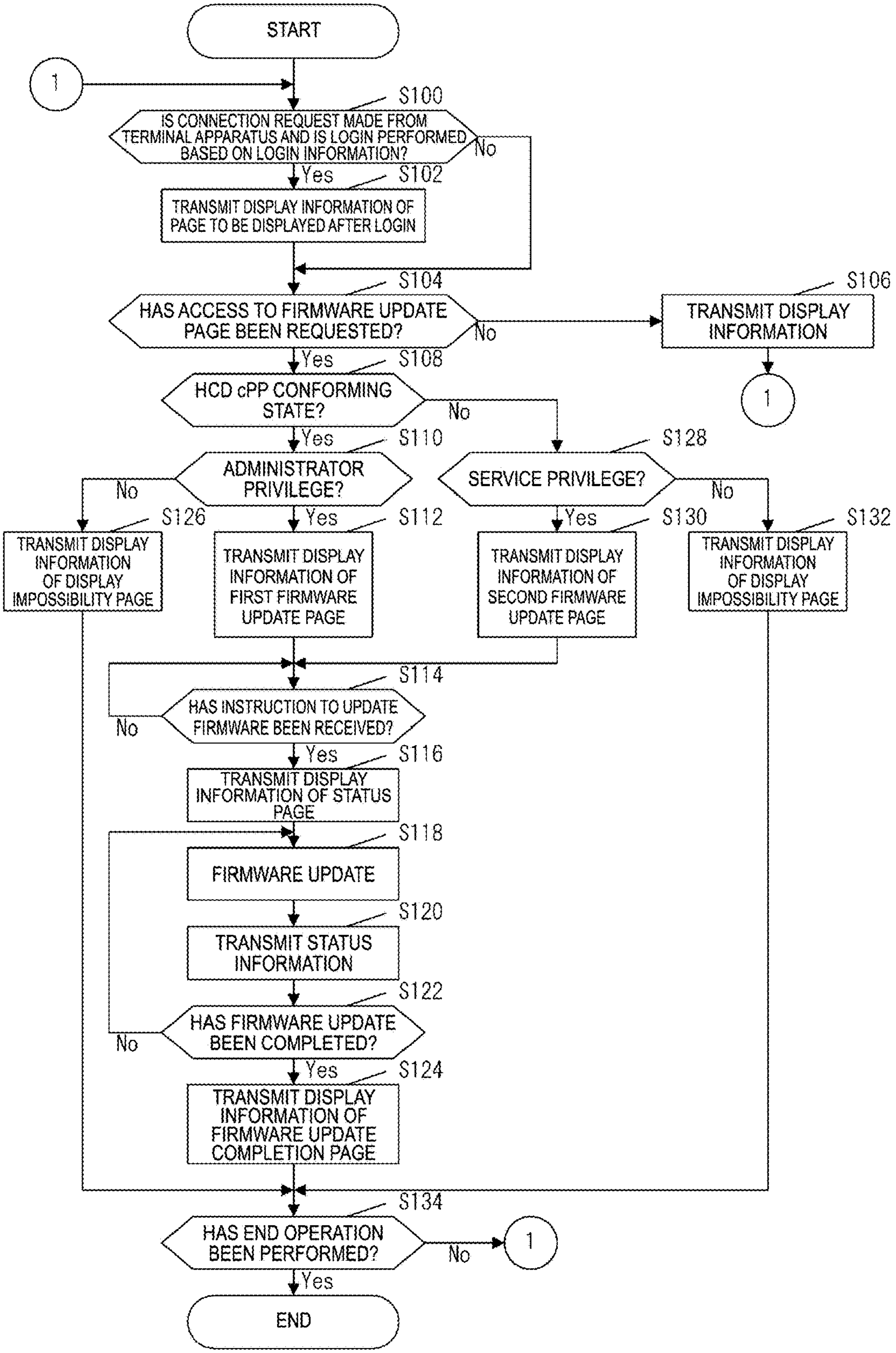
FIG. 5 is a flowchart of main processing of the image forming apparatus of the first embodiment.

In the present embodiment, in step S112 of FIG. 5, the controller 100 transmits display information of a first firmware update page including the attention message related to the firmware update (for example, attention message at the time of updating the firmware) to the terminal apparatus 20. On the other hand, by receiving the display information of the first firmware update page including the attention message, the controller 200 displays the first firmware update page including the attention message in step S184 of FIG. 7.

On the other hand, in step S130 of FIG. 5, the controller 100 transmits display information of a second firmware update page not including the attention message related to the firmware update to the terminal apparatus 20.

Note that when a status page or a firmware update completion page is displayed as the administrator web page, the controller 100 may include the attention message related to the firmware update in the status page or the firmware update completion page. In this case, the controller 100 may transmit the display information including the attention message to the terminal apparatus 20 in step S116 and step S124 of FIG. 5. On the other hand, when the status page or the firmware update completion page is displayed as the service web page, the controller 100 does not need to include the attention message related to the firmware update in the status page or the firmware update completion page.

Figure 18A:
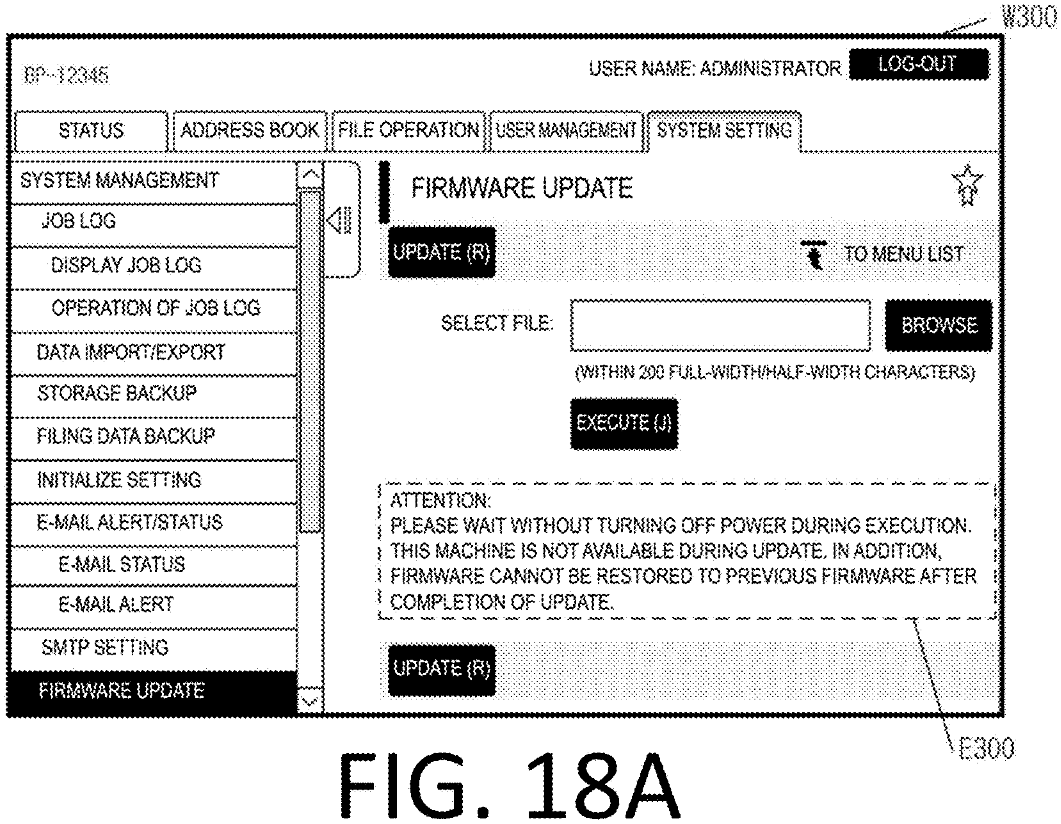
FIG. 18A and FIG. 18B are diagrams illustrating an operation example of a third embodiment.

FIG. 18A illustrates a display example of a first firmware update page W300. The first firmware update page W300 includes an area E300 for displaying the attention message related to the firmware update. Examples of the attention message related to the firmware update include an attention message notifying that the image forming apparatus 10 should not be turned off during the firmware update, an attention message notifying that the image forming apparatus 10 cannot be used during the firmware update, and an attention message notifying that the original firmware cannot be restored after completion of the firmware update.

Figure 18B:
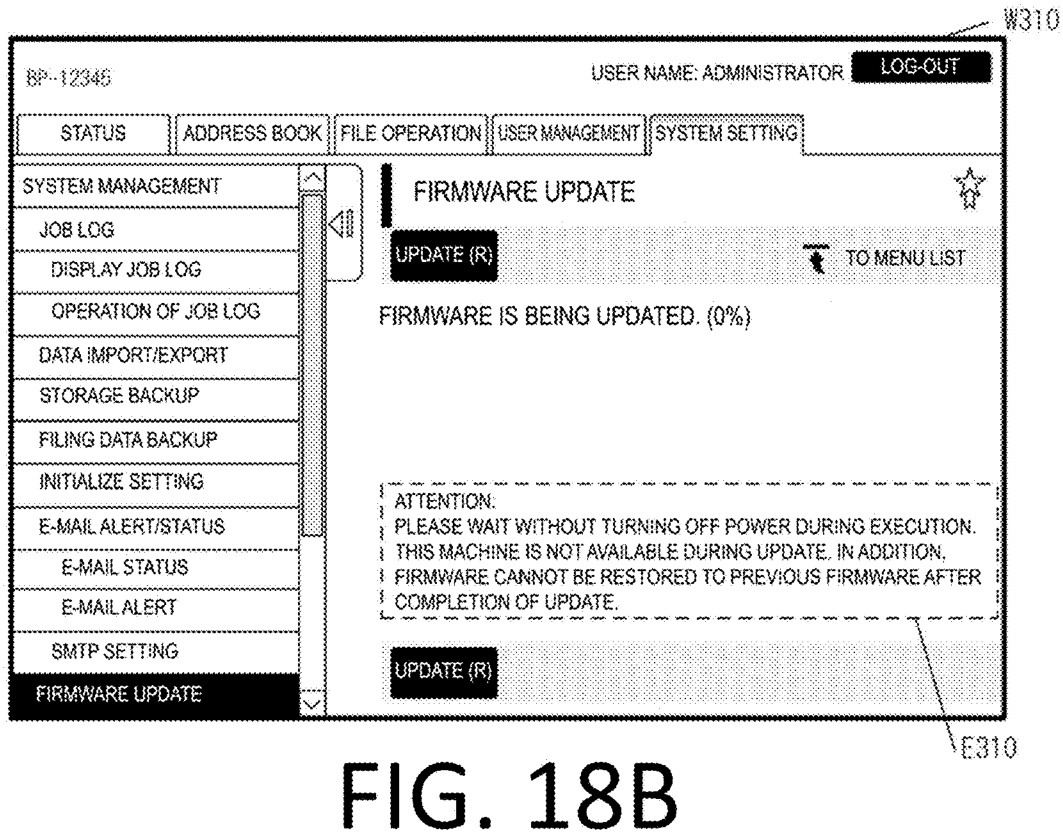

FIG. 18B illustrates a display example of a status page W310 displayed as the administrator web page. As illustrated in FIG. 18B, the status page W310 may include an area E310 for displaying the attention message related to the firmware update. Note that the firmware update completion page displayed as the administrator web page may also include an area for displaying the attention message related to the firmware update.

According to the present embodiment, the device web page including the attention message related to the firmware update is displayed on the terminal apparatus used by the user who has the administrator privilege. As a result, even when the user who has the administrator privilege is not familiar with the operation of the image forming apparatus, the image forming apparatus of the present embodiment displays the device web page including the attention message, so that the user can check the attention message and appropriately update the firmware. On the other hand, in the case of the service person, the image forming apparatus of the present embodiment displays the device web page that does not including the attention message, so that the service person can immediately recognize the content of the device web page.

4. Fourth Embodiment

In a fourth embodiment, processing is executed in accordance with a situation when the network between the image forming apparatus and the terminal apparatus is disconnected, in addition to the processing described in the first embodiment. In the present embodiment, FIG. 5 of the first embodiment is replaced with FIG. 19, and FIG. 7 of the first embodiment is replaced with FIG. 20. Note that the same processing is denoted by the same reference numeral, and description thereof is omitted.

4.1 Processing Flow

4.1.1 Image Forming Apparatus

Figure 19:
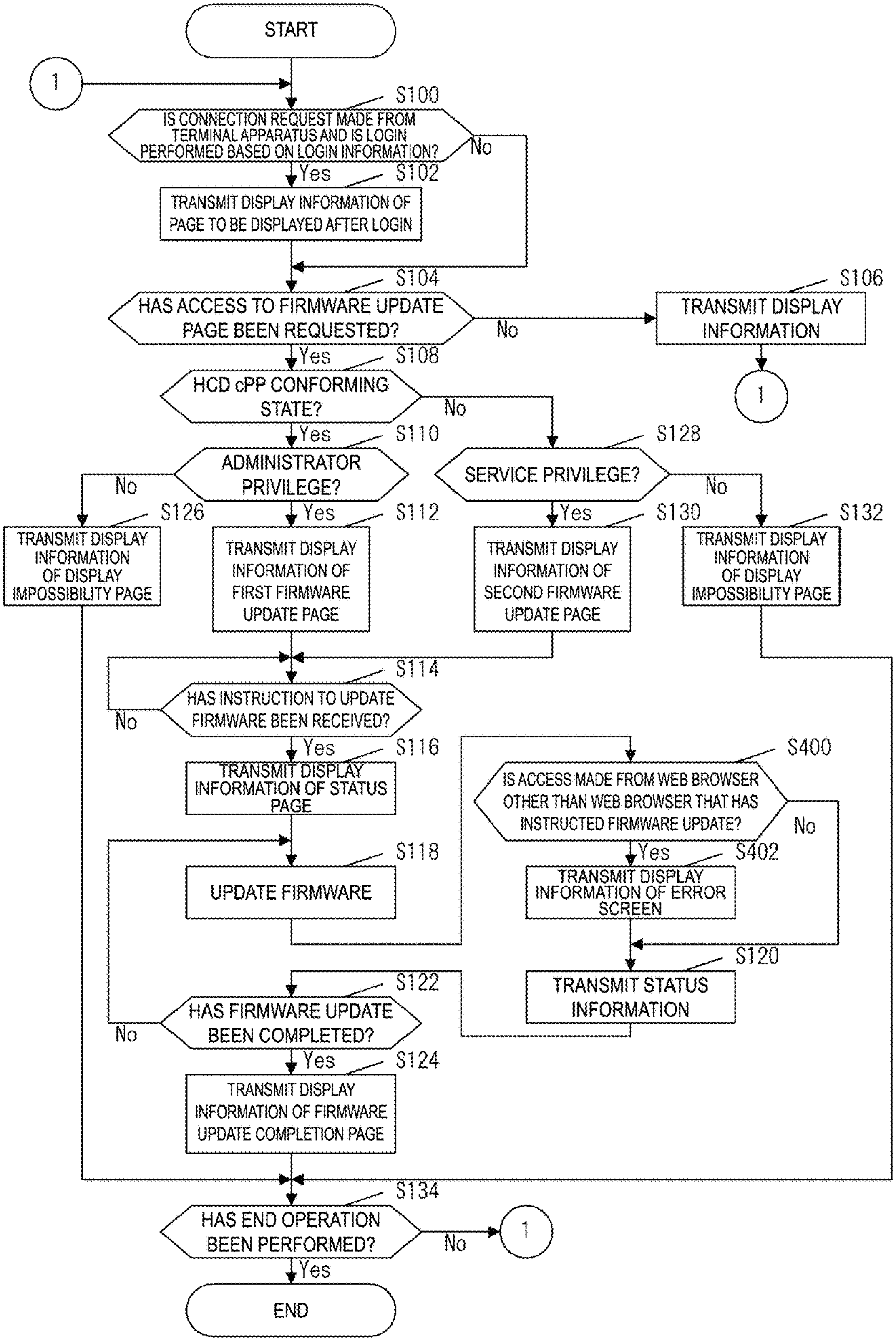
FIG. 19 is a flowchart of main processing of an image forming apparatus of a fourth embodiment.

FIG. 19 is a flowchart of main processing executed by the controller 100 of the image forming apparatus 10 of the present embodiment. In the present embodiment, after execution of the processing of step S118, the controller 100 determines whether access to a device web page has been requested from a web browser other than the web browser that has instructed the firmware update (step S400).

When the access to the device web page is requested from the web browser other than the web browser that has instructed the firmware update, the controller 100 transmits display information of an error screen to the terminal apparatus 20 that displays the web browser (Yes in step S400 and proceeding to step S402). The error screen is, for example, a screen indicating rejection of the access to the device web page. When the access to the device web page is not requested from the web browser other than the web browser that has instructed the firmware update, the controller 100 omits the processing of step S402 (No in step S400).

4.1.2 Terminal Apparatus

Figure 20:
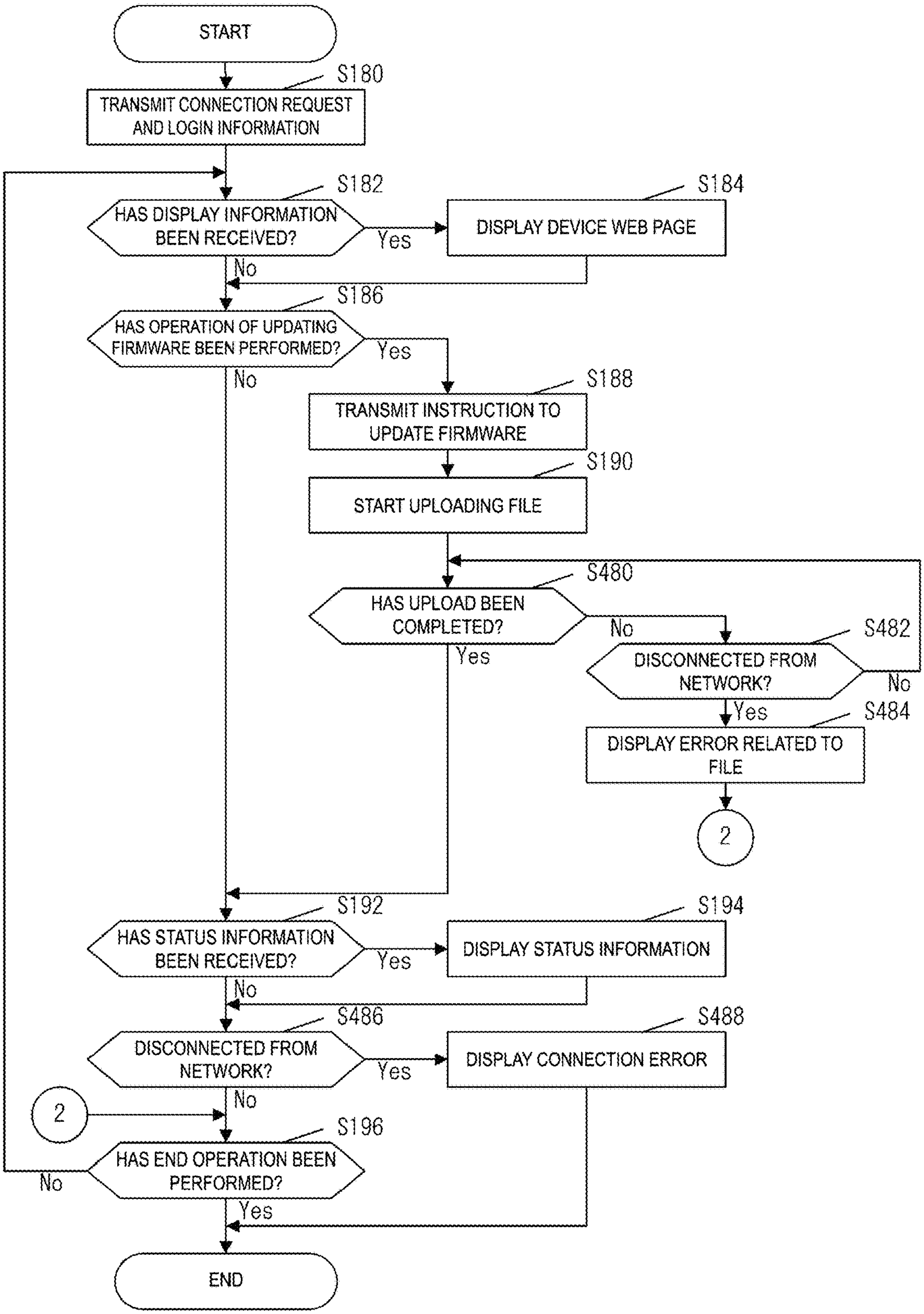
FIG. 20 is a flowchart of main processing of a terminal apparatus of the fourth embodiment.

FIG. 20 is a flowchart of main processing executed by the controller 200 of the terminal apparatus 20 of the present embodiment. In the present embodiment, the controller 200 starts uploading a file to be used for the firmware update to the image forming apparatus 10 in step S190 and then determines whether the upload of the file has completed (step S480).

When the upload of the file to be used for the firmware update does not complete, that is, when the file is being uploaded, the controller 200 determines whether the terminal apparatus 20 has been disconnected from the network (No in step S480 and proceeding to step S482).

When the network is disconnected during the upload of the file to be used for the firmware update, the controller 200 displays an error related to the file to be used for the firmware update on the display 240 (Yes in step S482 and proceeding to step S484). On the other hand, when the network with the image forming apparatus 10 is not disconnected, the controller 200 returns to step S480 (No in step S482 and proceeding to step S480). Accordingly, when the network is disconnected during the upload of the file to be used for the firmware update, an error screen related to the file is displayed on the terminal apparatus 20.

When it is determined in step S480 that the upload of the file to be used for the firmware update has completed, the controller 200 executes the processing of step S192 (Yes in step S480 and proceeding to step S192).

In addition, when the file to be used for the firmware update is not uploaded and the terminal apparatus 20 is disconnected from the network, the controller 200 displays a connection error on the display 240 (Yes in step S486 and proceeding to step S488). In this case, the controller 200 displays the connection error on the display 240 and then ends the processing described in FIG. 20.

4.2 Operation Example

Figure 21:
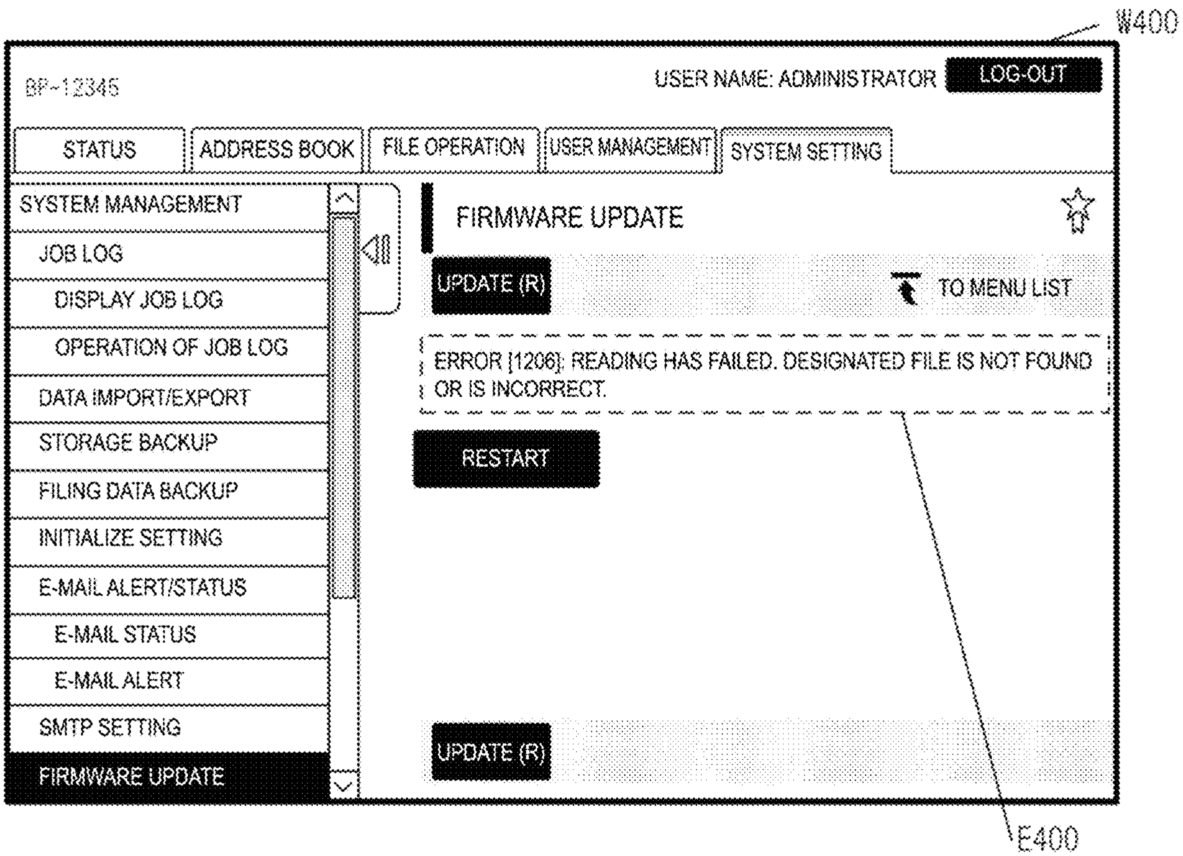
FIG. 21 is a diagram illustrating an operation example of the fourth embodiment.

FIG. 21 is a diagram illustrating a display example of an error screen W400 displayed when the terminal apparatus 20 is disconnected from the network during the upload of the file to be used for the firmware update. The error screen W400 includes an area E400 for displaying the error message related to the file used for the firmware update. As the error message related to the file, for example, a message indicating failure of reading of the file, a message indicating that the designated file has not been found, or a message indicating that the file is incorrect is displayed.

Figure 22A:
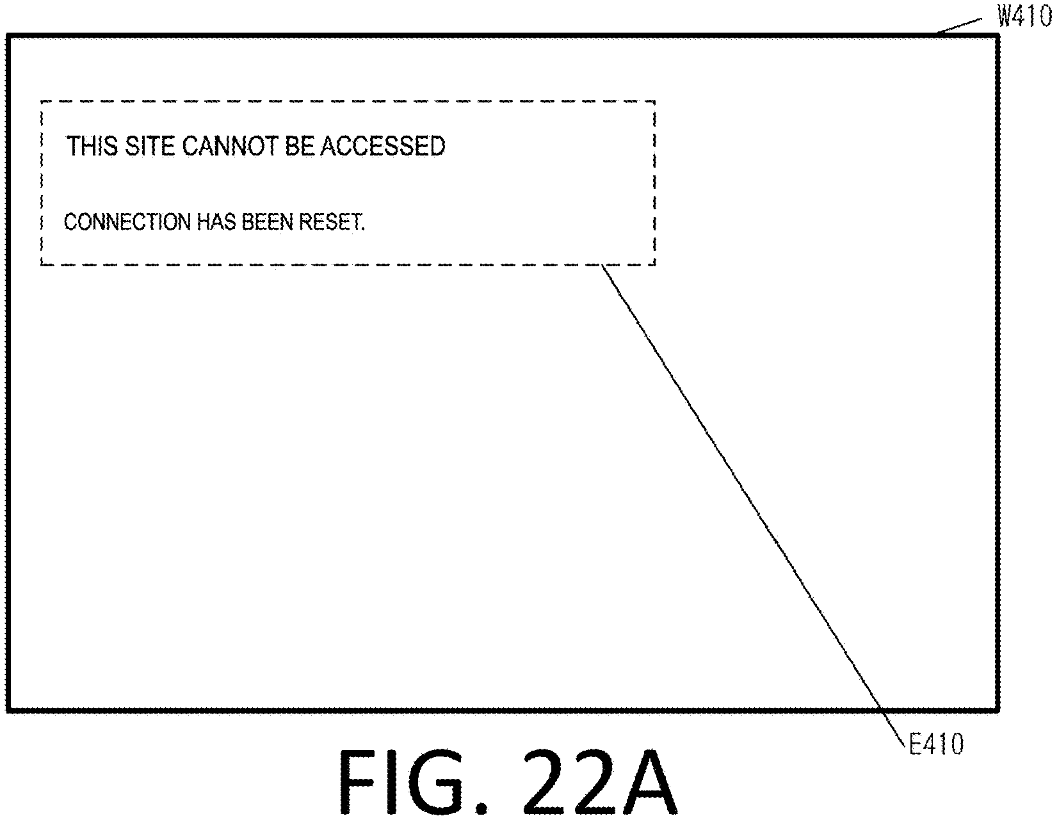
FIG. 22A and FIG. 22B are diagrams illustrating an operation example of the fourth embodiment.

FIG. 22A is a diagram illustrating a screen example of a screen W410 displayed when the file to be used for the firmware update is not uploaded and the terminal apparatus 20 is disconnected from the network. The screen W410 includes an area E410 for displaying a message indicating a connection error.

Figure 22B:
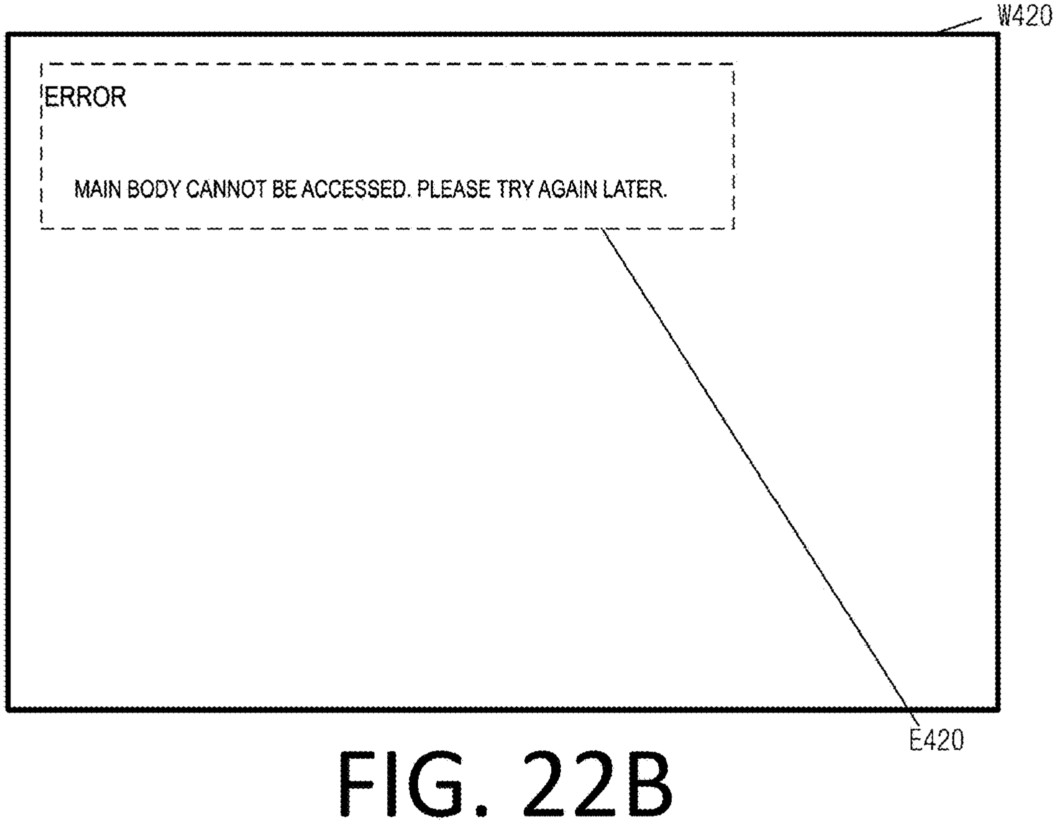

FIG. 22B is a diagram illustrating a display example of an error screen W420 displayed when the terminal apparatus 20 different from the terminal apparatus 20 that has instructed the firmware update accesses the image forming apparatus 10 to display the device web page. The error screen W420 includes an area E420 for displaying a message indicating that the access to the device web page has been rejected. Note that, on the other hand, status information is transmitted from the image forming apparatus 10 to the terminal apparatus 20 that has instructed the firmware update. Thus, during the firmware update, the progress of the firmware update and the firmware update completion page (the result screen of the firmware update) are displayed only on the web browser that has instructed the firmware update. As a result, the user who operates the web browser that has instructed the firmware update can perform an operation related to the firmware update. On the other hand, an error screen is displayed on a web browser other than the web browser that has instructed the firmware update. As a result, a user who uses a web browser other than the web browser that has instructed the firmware update cannot perform an operation related to the firmware update.

In this manner, according to the present embodiment, even when the terminal apparatus is disconnected from the network, the terminal apparatus can cause the user or the service person to recognize the situation. In addition, the image forming apparatus displays the error screen on the browser other than the browser that has instructed the firmware update and thus causes the user or the service person to recognize that the access to the device web page has been rejected.

5. Modified Example

The present disclosure is not limited to the embodiments described above and can be changed in various manners. In other words, embodiments obtained by combining technical mechanisms appropriately changed without departing from the gist of the present disclosure are also included in the technical scope of the present disclosure.

Although some parts of the above-described embodiments are described separately for convenience of explanation, it is a matter of course that combinations can be executed within a technically allowable range. For example, the second embodiment and the third embodiment may be combined and executed. In this case, a page in which whether to automatically update the status page is selectable and which includes the attention message is displayed as the first firmware update page.

In the above-described embodiments, the image processing apparatus may be a server apparatus or a terminal apparatus such as a smartphone. For example, the present disclosure may be achieved as an application that executes the same processing as the processing described in the above-described embodiments, and the application may be executed at the terminal apparatus.

The program that operates in each of the above-described apparatus may be recorded in a non-transitory computer-readable medium and provided. The programs running on each device in the embodiments are programs for controlling a CPU or the like (programs for causing a computer to function) to realize the aforementioned functions in the embodiments. The information handled by these devices is temporarily accumulated in a temporary storage device (for example, a RAM) at the time of processing, is then stored in a storage device such as a read only memory (ROM) or an HDD, and is read, corrected, and written by the CPU as needed.

The recording medium storing the programs may be any of a semiconductor medium (for example, a ROM, a non-volatile memory card, or the like), an optical recording medium or a magneto-optical recording medium (for example, a digital versatile disc (DVD), a magneto optical disc (MO), a mini disc (MD), a compact disc (CD), a Blu-ray (trade name) disc (BD) or the like), a magnetic recording medium (for example, a magnetic tape, a flexible disk, or the like), and the like. Not only the aforementioned functions of the embodiments are realized by executing the loaded programs, but also the functions of the present disclosure may be realized by performing processing in cooperation with an operating system, another application program, or the like based on instructions of the programs.

In a case where the programs are distributed to the market, the programs can be stored and distributed in a portable recording medium, or can be transferred to a server computer connected via a network such as the Internet. In this case, it is a matter of course that the storage device of the server computer is also included in the present disclosure.

In addition, each functional block or various features of the apparatuses used in the above-described embodiments may be implemented or executed by an electric circuit, for example, an integrated circuit or a plurality of integrated circuits. An electric circuit designed to execute the function described in the present specification may include a general-purpose processor, a digital signal processor (DSP), an application specific integrated circuit (ASIC), a field programmable gate array (FPGA) or other programmable logic devices, discrete gate or transistor logic, discrete hardware components, or a combination thereof. The general-purpose processor may be a microprocessor, or any known processor, controller, microcontroller, or state machine. The above-described electric circuit may be constituted by a digital circuit or an analog circuit. In addition, in a case where an integrated circuit technology that replaces the current integrated circuit becomes available due to advancement of the semiconductor technology, one or more aspects of the present disclosure can use a new integrated circuit based on the new integrated circuit technology. For example, some or all of the processors included in the controller 100 may be constituted by an electronic circuit in the case of the image forming apparatus 10 of the present disclosure.

REFERENCE SIGNS LIST

1 System
10 Image forming apparatus
102 Login processor
104 Firmware update processor
110 External interface
120 Image input unit
130 Image former
140 Operation panel
142 Display
144 Operation inputter
160 Storage
170 RAM
180 ROM
182 Firmware
190 Communicator
20 Terminal apparatus
200 Controller
240 Display
250 Operation inputter
260 Storage
290 Communicator

The invention claimed is:

1. A control system comprising:
an image forming apparatus; and
a terminal apparatus, wherein
the image forming apparatus:
determines whether the image forming apparatus is in a state conforming to a security requirement in response to a connection request from the terminal apparatus used by a user who has an administrator privilege; and
transmits, to the terminal apparatus, display information of a first display screen through which a firmware update of the image forming apparatus is to be performed when the image forming apparatus is in the state conforming to the security requirement, the first display screen including a selection item allowing selection of whether to display a status of the firmware update, and
the terminal apparatus displays, based on the display information of the first display screen, the first display screen including the selection item allowing the selection of whether to display the status of the firmware update.

2. The control system according to claim 1, wherein
the image forming apparatus restricts, in response to the connection request from the terminal apparatus used by the user who has the administrator privilege, transmission of the display information of the first display screen to the terminal apparatus when the image forming apparatus is not in the state conforming to the security requirement.

3. The control system according to claim 1, wherein
the terminal apparatus displays an attention message related to the firmware update based on the display information of the first display screen.

4. The control system according to claim 1, wherein the image forming apparatus:
determines whether the image forming apparatus is in the state conforming to the security requirement in response to a connection request from the terminal apparatus used by a user who has a service privilege;
transmits display information of a second display screen through which the firmware update of the image forming apparatus is to be performed when the image forming apparatus is not in the state conforming to the security requirement; and
restricts transmission of the display information of the second display screen when the image forming apparatus is in the state conforming to the security requirement, and
the terminal apparatus displays the second display screen based on the display information of the second display screen when having received the display information.

5. The control system according to claim 1, wherein the terminal apparatus displays an error related to a file to be used for the firmware update when a network disconnects during uploading of the file after the uploading of the file to the image forming apparatus has started.

6. An image forming apparatus comprising:
one or more controllers; and
a communicator that communicates with a terminal apparatus, wherein
the one or more controllers:
determine whether the image forming apparatus is in a state conforming to a security requirement in response to a connection request from the terminal apparatus used by a user who has an administrator privilege; and
transmit, to the terminal apparatus via the communicator, display information of a display screen through which a firmware updated is to be performed when the image forming apparatus is in the state conforming to the security requirement, the display screen including a selection item allowing selection of whether to display a status of the firmware update.

7. A control method of a control system including an image forming apparatus and a terminal apparatus, the control method comprising:
determining, by the image forming apparatus, whether the image forming apparatus is in a state conforming to a security requirement in response to a connection request from the terminal apparatus used by a user who has an administrator privilege;
transmitting, by the image forming apparatus to the terminal apparatus, display information of a display screen through which a firmware update of the image forming apparatus is to be performed when the image forming apparatus is in the state conforming to the security requirement, the display screen including a selection item allowing selection of whether to display a status of the firmware update; and
displaying, by the terminal apparatus, the display screen including the selection item allowing the selection of whether to display the status of the firmware update based on the display information.

* * * * *